(12) United States Patent
Heckmeier et al.

(10) Patent No.: US 6,815,017 B2
(45) Date of Patent: Nov. 9, 2004

(54) ELECTROOPTICAL LIQUID CRYSTAL DISPLAY

(75) Inventors: Michael Heckmeier, Bensheim (DE); Eike Poetsch, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/343,768

(22) PCT Filed: Jul. 11, 2001

(86) PCT No.: PCT/EP01/07980

§ 371 (c)(1),
(2), (4) Date: Feb. 4, 2003

(87) PCT Pub. No.: WO02/12415

PCT Pub. Date: Feb. 14, 2002

(65) Prior Publication Data

US 2003/0207045 A1 Nov. 6, 2003

(30) Foreign Application Priority Data

Aug. 4, 2000 (DE) ......................................... 100 38 859

(51) Int. Cl.[7] ........................ C09K 19/34; C09K 19/30; C09K 19/12; C09K 19/20
(52) U.S. Cl. .............. 428/1.1; 252/299.61; 252/299.63; 252/299.64; 252/299.65; 252/299.66; 252/299.67
(58) Field of Search ...................... 428/1.1; 252/299.61, 252/299.63, 299.64, 299.65, 299.66, 299.67; 549/369; 570/127

(56) References Cited

U.S. PATENT DOCUMENTS 5,993,691 A    11/1999  Pausch et al.

FOREIGN PATENT DOCUMENTS

DE    19528104    2/1997
DE    19811456    9/1999

OTHER PUBLICATIONS

Dabrowski R et al., "Dielectric studies of Smectogenic dioxane mixtures revealing a nematic gap," Liquid Crystals, Apr. 1, 1998, pp. 583–586, vol. 24, No. 4, XP00740843, ISSN: 0267–8292, the whole document, Taylor and Francis Ltd., London, GB.

*Primary Examiner*—Shean C. Wu
(74) *Attorney, Agent, or Firm*—Millen, White, Zelano, Branigan, P.C.

(57) ABSTRACT

The invention relates to an electrooptical liquid crystal display comprising a reorientation layer for reorientation of the liquid crystals. The field of said reorientation layer has a component parallel to the liquid crystal layer, said component being crucial for the reorientation. Said component comprises a liquid-crystalline medium having a positive dielectric anisotropy and contains at least one mesogenic compound of the formula (I), wherein $R^1$ and L are delined as in claim 1.

34 Claims, No Drawings

ELECTROOPTICAL LIQUID CRYSTAL DISPLAY

The invention relates to an electro-optical liquid-crystal display having a realignment layer for realignment of the liquid crystals whose field has a component parallel to the liquid-crystal layer that is crucial for the realignment, containing a liquid-crystalline medium of positive dielectric anisotropy, where the medium comprises at least one mesogenic compound of the formula I.

In conventional liquid-crystal displays (TN, STN, OMI or AMD-TN), the electric fields for realignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating a display of this type are described, for example, by R. A. Soref in Journal of Applied Physics, Vol. 45, No. 12, pp. 5466–5468 (1974).

EP 0 588 568, for example, discloses various possibilities for the design of the electrodes and for addressing a display of this type. DE 198 24 137 likewise describes various embodiments of IPS displays of this type.

Liquid-crystalline materials for IPS displays of this type are described, for example, in DE 195 28 104.

The IPS displays containing the known liquid-crystalline media are characterised by inadequate, long response times and often excessively high operating voltages. There is thus a demand for IPS displays which do not have these disadvantages or only do so to a reduced extent. To this end, in particular liquid-crystalline materials are required which, besides an adequate phase range, low tendency towards crystallisation at low temperatures, low birefringence and adequate electrical resistance, have, in particular, low threshold voltages ($V_{10}$) and low rotational viscosities ($\gamma_1$), which are crucial for the response times.

This object has, surprisingly, been achieved by the use of liquid-crystalline materials in mixtures which comprise at least one compound of the formula I.

The IPS mixtures according to the invention are distinguished by their relatively low rotational viscosity values $\gamma_1$ and their low threshold voltage and response time values.

The invention thus relates to an electro-optical liquid-crystal having a realignment layer for realignment of the liquid crystals whose field has a significant component parallel to the liquid-crystal layer, containing a liquid-crystalline medium of positive dielectric anisotropy, where the medium comprises at least one compound of the formula I

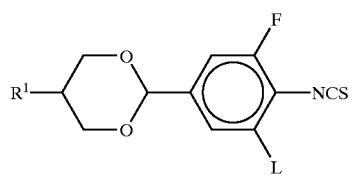

in which
$R^1$ is an alkyl or alkenyl radical having up to 15 carbon atoms which is unsubstituted, monosubstituted by CN or $CF_3$ or at least monosubstituted by halogen and in which, in addition, one or more $CH_2$ groups in these radicals may each, independently of one an other, be replaced by —O—, —S—,

—CO—, —CO—O—, —O—CO— or —O—CO—O— in such a way that O atoms are not linked directly to one another, and L is H or F.

Particular preference is given to compounds of the formula I in which L is F.

In the compounds of the formula I, $R^1$ is preferably alkyl or alkenyl having up to 7 carbon atoms. $R^1$ is preferably ethyl, n-propyl, n-pentyl, vinyl, 1E-alkenyl or 3E-alkenyl.

The compounds of the formula I have high dielectric anisotropy values and relatively high birefringence and clearing point values. Their use in liquid-crystal mixtures for IPS displays according to the invention facilitates high dielectric anisotropies and low rotational viscosities with retention of high clearing points and favourable birefringence values and effects low threshold voltages and short response times.

It has been found, in particular, that IPS mixtures according to the invention comprising one or more, preferably one or two, compounds of the formula I have significantly higher dielectric anisotropy values, lower rotational viscosity and threshold voltage values, as well as shorter response times than, for example, analogous mixtures which, instead of the compounds of the formula I, comprise 3,5-difluoro-4-cyanophenylcyclohexanes of the formula

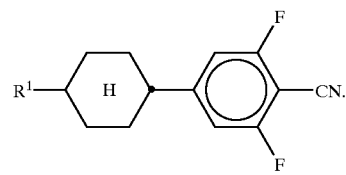

Some of the compounds of the formula I are disclosed in DE 40 27 869 A1. However, this patent application does not describe IPS displays.

Preferred embodiments are IPS displays in which
a) the liquid-crystalline medium additionally comprises one or more compounds of the formula II containing a cyano group

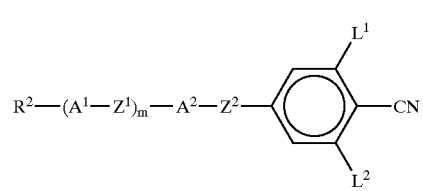

in which
$R^2$ is H, an alkyl or alkenyl radical having up to 15 carbon atoms which is unsubstituted, monosubstituted by CN or $CF_3$ or at least mono-substituted by halogen and in which,,in addition, one or more $CH_2$ groups in these radicals may also each, independently of one another, be replaced by —O—, —S—,

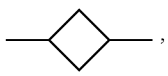

—CO—, —CO—O—, —O—CO— or —O—CO—O— in such a way that O atoms are not linked directly to one another, $A^1$ and $A^2$ are each, independently of one another,
(a) a trans-1,4-cyclohexylene radical or 1,4-cyclohexenylene radical, in which, in addition, one more non-adjacent $CH_2$ groups may be replaced by —O— and/or —S—,
(b) a 1,4-phenylene radical, in which, in addition, one or two CH groups may be replaced by N,
(c) a radical from the group consisting of 1,4 bicyclo[2.2.2]octylene, piperidine-1,4-diyl, naphthalene-2,6-diyl, decahydronaphthalene-2,6-diyl and 1,2,3,4-tetrahydronaphthalene-2,6-diyl,
where the radicals (a), (b) and (c) may be substituted by one or two fluorine atoms, $Z^1$ and $Z^2$ are each, independently of one another, —CO—O—, —O—CO—, —$CH_2$O—, —O$CH_2$—, —$CH_2CH_2$—, —CH=CH—, —C≡C—, —CHF—CHF—, —CF=CF—, —$CF_2$O—, —OC$F_2$—, —$CF_2CF_2$— or a single bond, and one or the radicals $Z^1$ and $Z^2$ is alternatively —$(CH_2)_4$— or —CH=CH—$CH_2CH_2$—, $L^1$ and $L^2$ are each, independently of one another, H or F, and m is 0, 1 or 2, b) the liquid-crystalline medium comprises one or more compounds of the formula III containing a 3,4,5-trifluorophenyl group

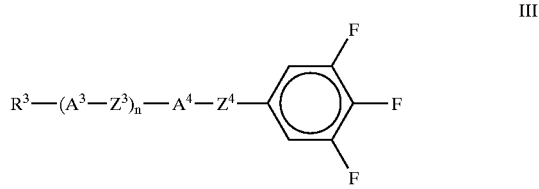

in which
$R^3$ has one of the meanings indicated for $R^2$ in the formula II,
$A^3$ and $A^4$ each, independently of one another, have one of the meanings indicated for $A^1$ and $A^2$ in the formula II,
$Z^3$ and $Z^4$ each, independently of one another, have one of the meanings indicated for $Z^1$ and $Z^2$ in the formula II, and
n is 0, 1 or 2, c) the liquid-crystalline medium comprises one or more compounds of the formula IV $$R^4\text{-}(A^5\text{-}Z^5)_o\text{-}A^8\text{-}R^5 \qquad \text{IV}$$

in which
$R^4$ and $R^5$ each, independently of one another, have one of the meanings indicated for $R^2$ in the formula II,
$A^5$ and $A^6$ each, independently of one another, have one of the meanings indicated for $A^1$ and $A^2$ in the formula II, each $Z^5$, independently of the others, has one of the meanings indicated for $Z^1$ and $Z^2$ in the formula II, and o is 1, 2 or 3 d) the liquid-crystalline medium additionally comprises one or more compounds of the formula V

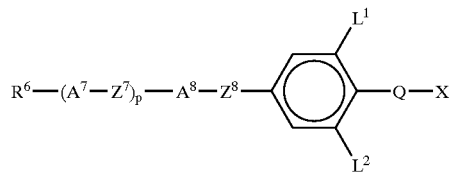

in which
$R^6$ has one of the meanings indicated for $R^2$ in the formula II,
$A^7$ and $A^8$ each, independently of one another, have one of the meanings indicated for $A^1$ and $A^2$ in the formula II,
$Z^7$ and $Z^8$ each, independently of one another, have one of the meanings: indicated for $Z^1$ and $Z^2$ in the formula II,
$L^1$ and $L^2$ are each, independently of one another, H or F,
Q is a polyfluoroalkylene radical of the formula:

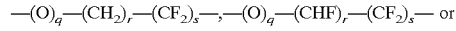

q is 0 or 1,
r is 0, 1, 2, 3, 4, 5 or 6,
s is 1, 2, 3, 4, 5 or 6,
X is H, F or Cl, and
p is 0, 1 or 2, and/or e) the liquid-crystalline medium additionally comprises one or more compounds of the formula III'

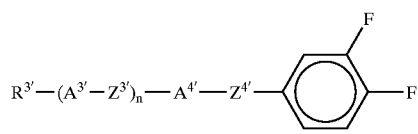

in which
$R^{3'}$ has one of the meanings indicated for $R^2$ in the formula II,
$A^{3'}$ and $A^{4'}$ each, independently of one another, have one of the meanings indicated for $A^1$ and $A^2$ in the formula II,
$Z^{3'}$ and $Z^{4'}$ each, independently of one another, have one of the meanings indicated for $Z^1$ and $Z^2$ in the formula II, and
n' is 0, or 2.

The compounds of the formula II are preferably selected from the group comprising the formulae IIa to IIq:

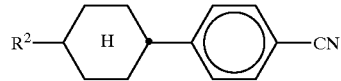

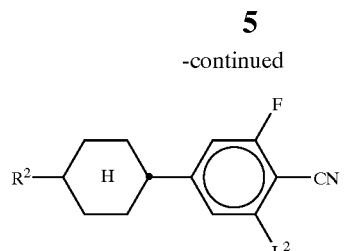
IIb

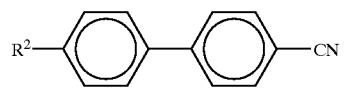
IIc

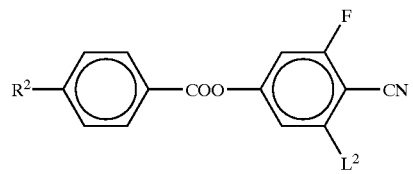
IId

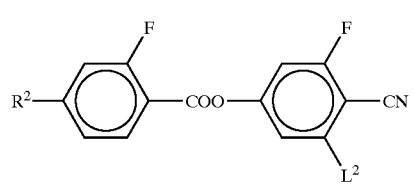
IIe

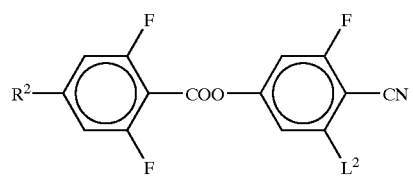
IIf

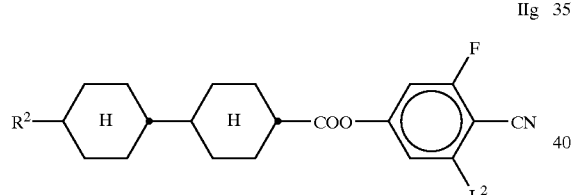
IIg

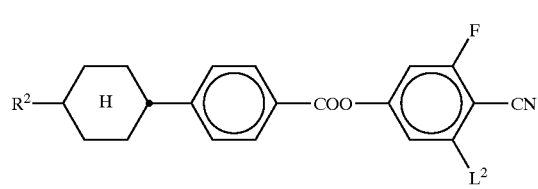
IIh

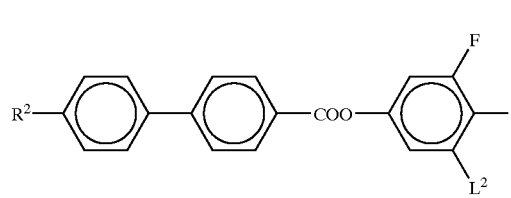
IIi

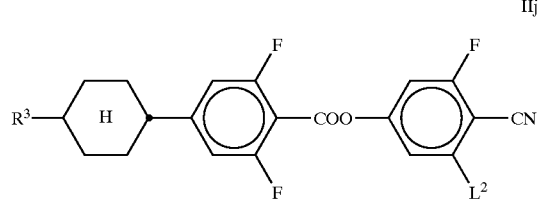
IIj

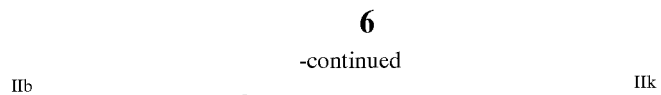
IIk

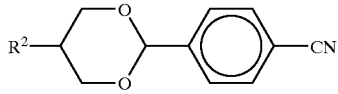
IIl

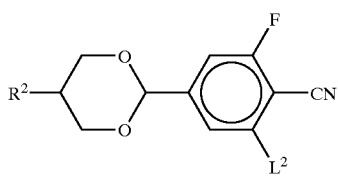
IIm

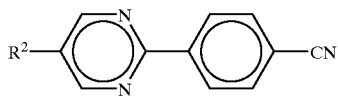
IIn

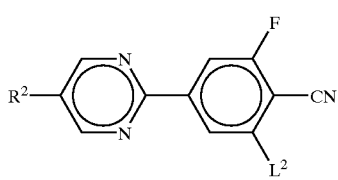
IIo

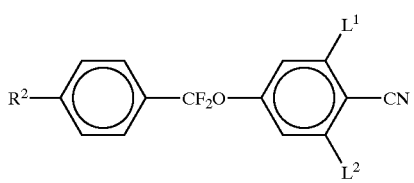
IIp

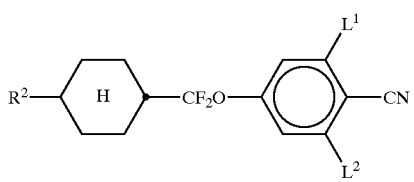
IIq

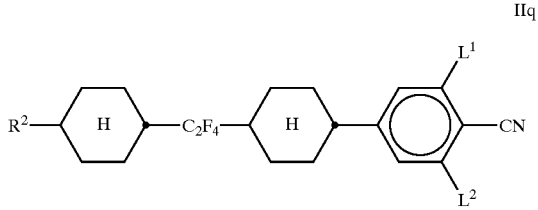

in which $R^2$ is as defined in the formula II, and $L^1$ and/or $L^2$ is H or F.

In the compounds of the formulae IIb, IIe, IIk, IIn and IIp, $L^2$ is particularly preferably F. In the compounds of the formulae IId, IIg, IIh and IIi, $L^2$ is particularly preferably H. In the compounds of the formula IIo and/or IIp, $L^1$ and $L^2$ are preferably fluorine.

The liquid-crystalline medium particularly preferably comprises one or more compounds selected from the group consisting of the compounds of the formulae IIa, IIb, IIc, IId, IIh, IIk and IIp.

In a further preferred embodiment, the liquid-crystalline medium comprises at least one heterocyclic compound selected from the group comprising the formulae IIm, IIn, IIo and IIp.

The compounds of the formula III are preferably selected from the group comprising the formulae IIa to IIIp and III"a,

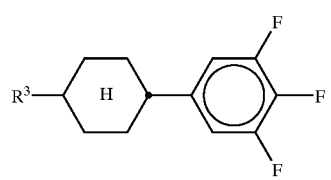
IIIa
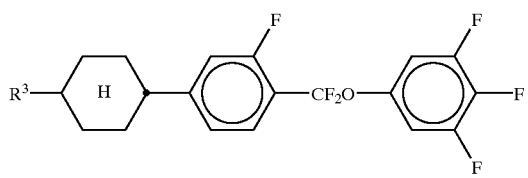
IIIi
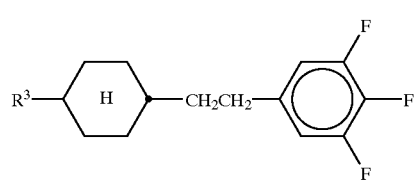
IIIb
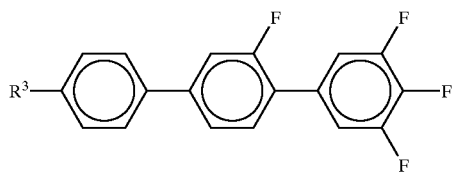
IIIj
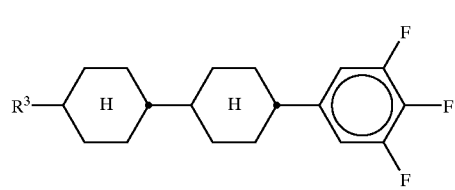
IIIc
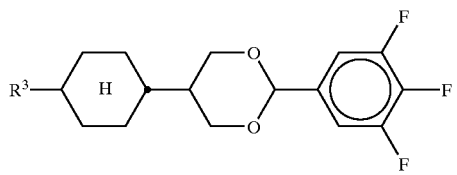
IIIk
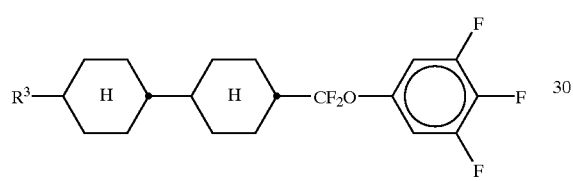
IIId
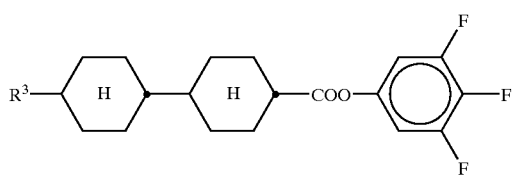
IIIl
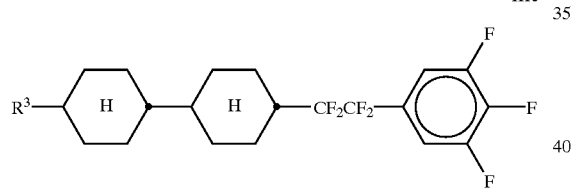
IIIe
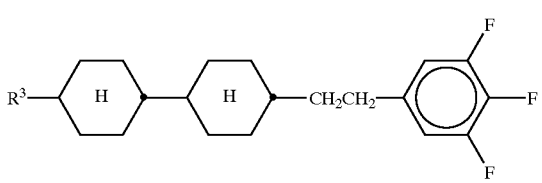
IIIm
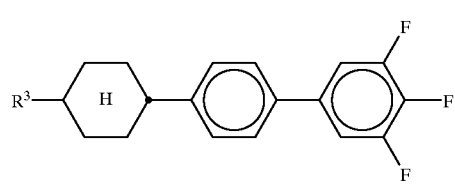
IIIf
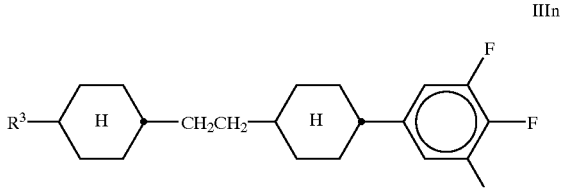
IIIn
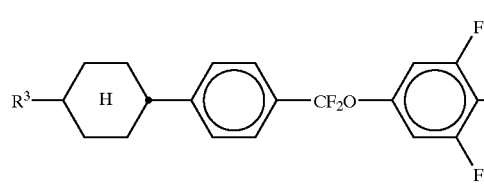
IIIg
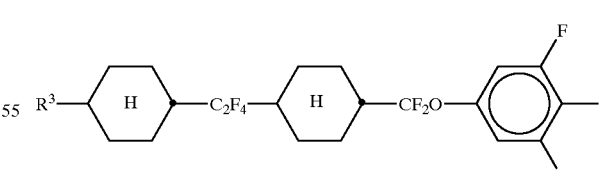
IIIo
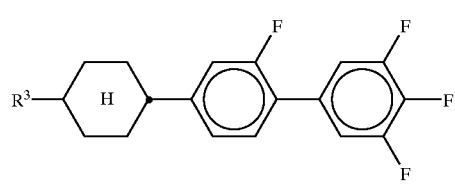
IIIh
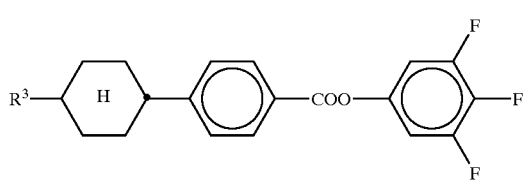
IIIp

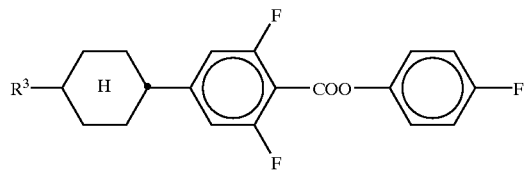

in which R³ is as defined in the formula III.

The liquid-crystal display particularly preferably contains a liquid-crystalline medium comprising one or more compounds selected from the group comprising the formulae IIIc, IIId, IIIe, IIIf, IIIg, IIIh, IIIi, IIIk and IIIn.

The compounds of the formula III' are preferably selected from the group comprising the formulae III'a to III'l:

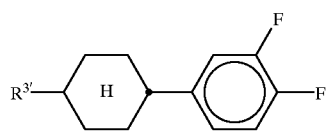

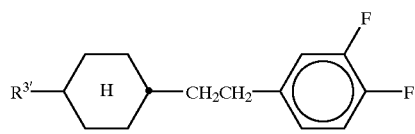

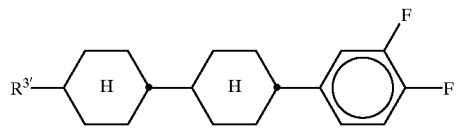

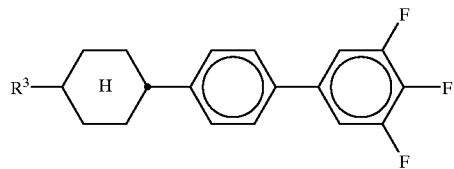

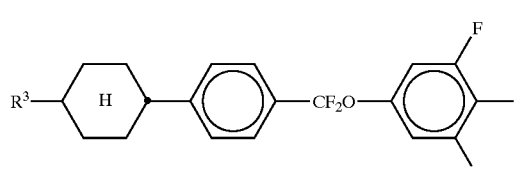

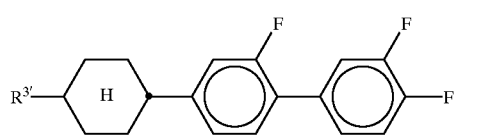

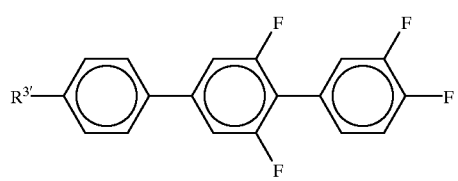

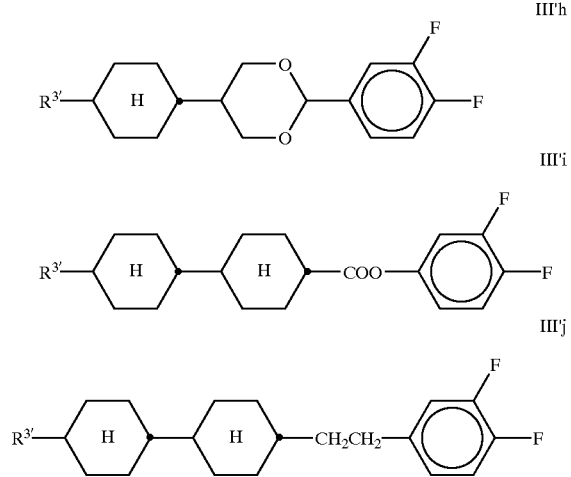

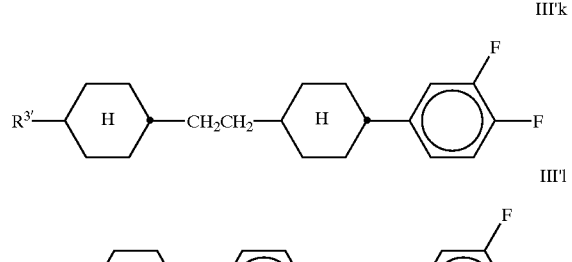

in which
R³' is as defined above under the formula III'.

As an alternative to or in addition to one or more compound(s) of the formula IIIc, the liquid-crystalline medium may comprise one or more compounds of the formula III'a,

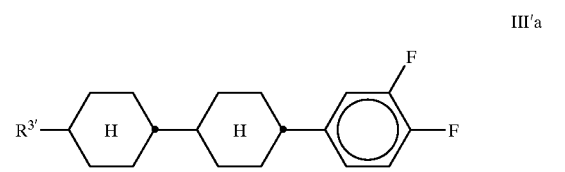

in which R³' is as defined above under the formula III'.

The compounds of the formula IV are preferably selected from the group comprising the formulae IVa to IVn:

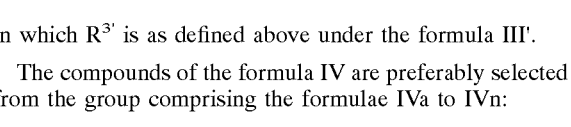

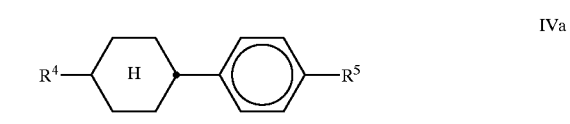

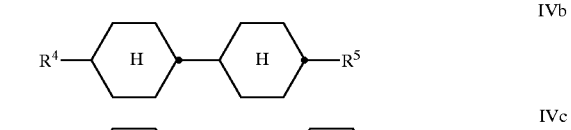

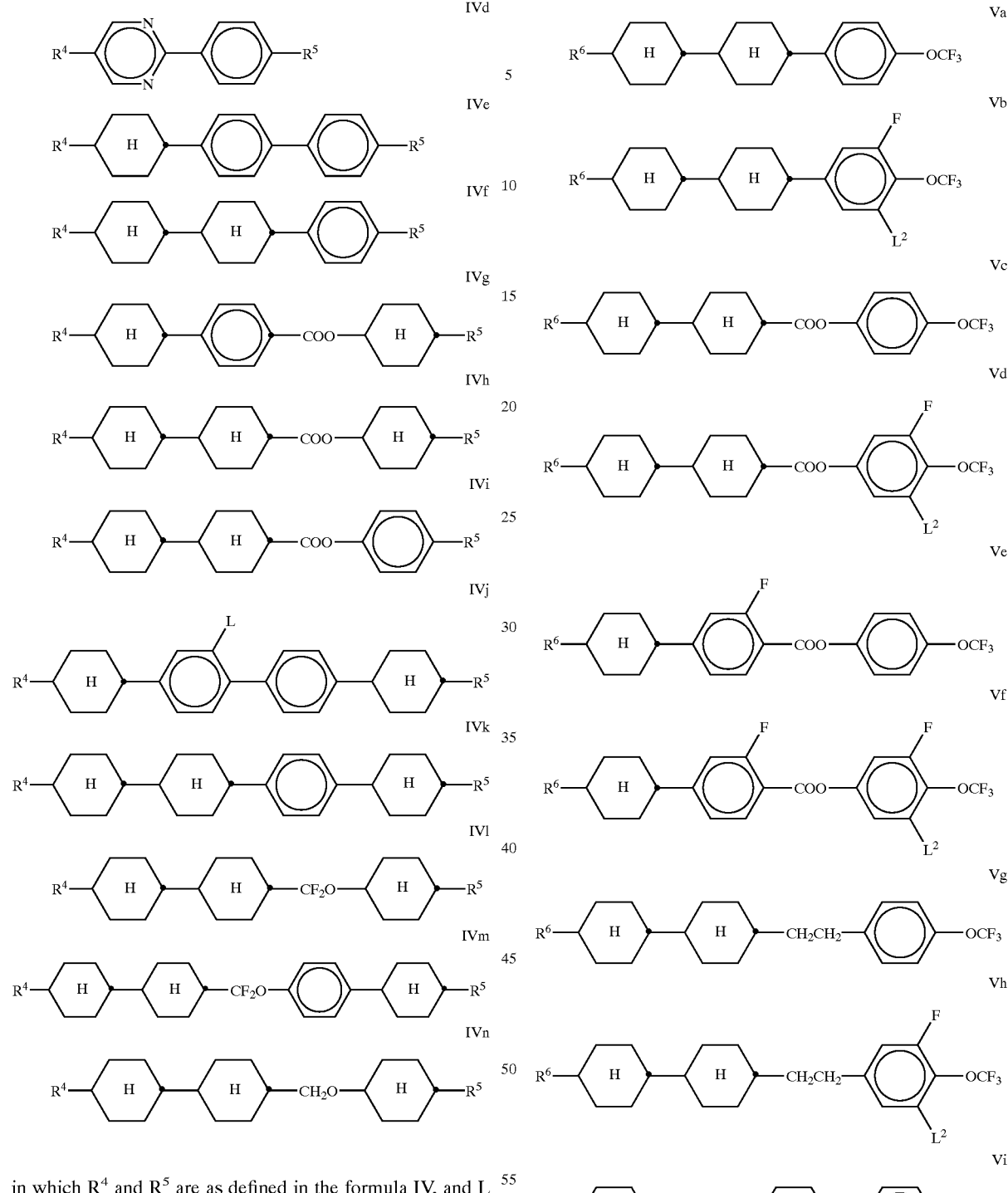

in which $R^4$ and $R^5$ are as defined in the formula IV, and L is H or F.

In the compounds of the formula IVj, L is particularly preferably F.

The liquid-crystal display particularly preferably contains a liquid-crystalline medium comprising one or more compounds selected from the group consisting of the compounds of the formulae IVb, IVe, IVk and IVm.

The compounds of the formula V are preferably selected from the group comprising the formulae Va to Vm:

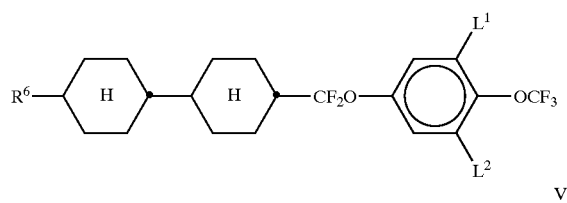
Vk

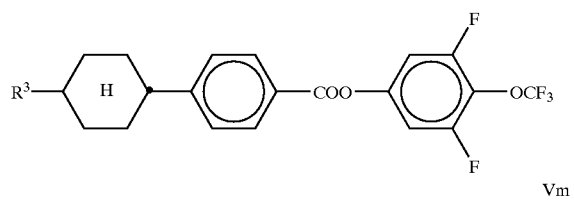
Vl

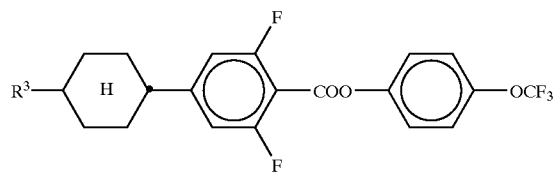
Vm in which R⁶ is as defined in the formula V, and $L^2$ is H or F.

In the compounds of the formula Vd, $L^2$ is particularly preferably F.

The liquid-crystalline medium particularly preferably comprises one or more compounds selected from the group consisting of the compounds of the formulae Va, Vc, Vd, Ve and Vf.

In a preferred embodiment, the liquid-crystalline medium comprises one or two compounds of the formula I and one or two compounds of the formula Ve.

In a further preferred embodiment, the liquid-crystalline medium comprises one or more alkenyl compounds of the formula VI

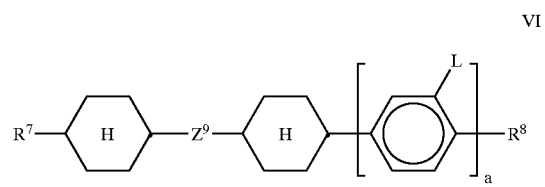
VI in which
  $R^7$ is an alkenyl group having 2 to 7 carbon atoms,
  $Z^9$ is —CH=CH—, —CH$_2$CH$_2$- or a single bond,
  L is H or F,
  a is 0 or 1 and
  $R^8$ is an alkyl, alkoxy or alkenyl group having up to 12 carbon atoms, in which, in addition, one or two non-adjacent CH$_2$ groups may be replaced by —CO—, —OCO— or —COO—, or, if a is 1, $R^8$ may alternatively be F.

The compounds of the formula VI are preferably selected from the group comprising the formulae VIa to VIf:

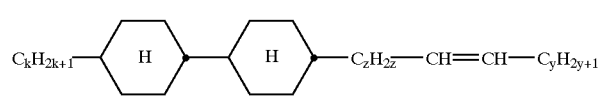
VIa

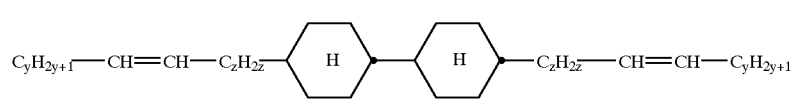
VIb

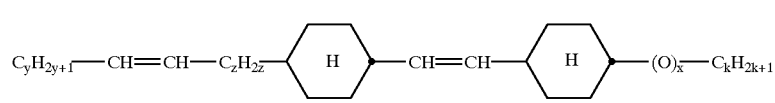
VIc

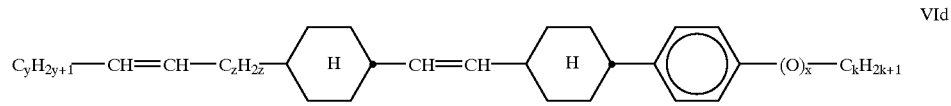
VId

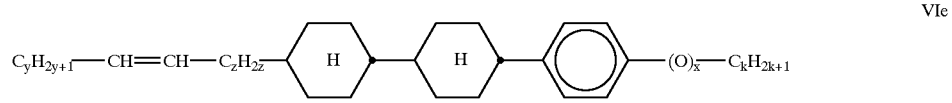
VIe

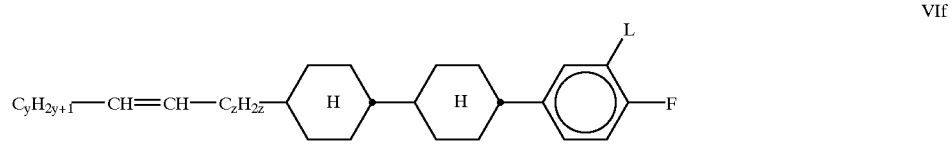
VIf in which k is 1, 2, 3, 4 or 5, y and z are each, independently of one another, 0, 1, 2 or 3, where y+z is $<\leq 5$, and x is 0 or 1.

In the compounds of the formula VIf, L is preferably F.

The mixtures according to the invention preferably comprise one or two compounds of the formula IVb and one or two compounds of the formula VIa.

Further preferred embodiments are the following mixtures for IPS displays:

The medium additionally comprises one or more compounds containing a 4-fluoro-phenyl group, selected from the group consisting of the formulae VIIa to VIIc:

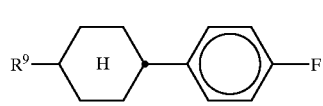

VIIa

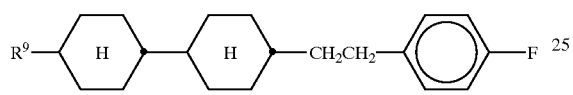

VIIb

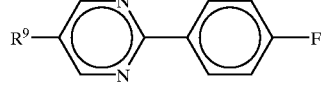

VIIc in which $R^9$ has the one of the meanings indicated for $R^3$ in the formula III, and in particular is alkyl having 1 to 7 carbon atoms;

The medium additionally comprises one or more compounds of the formula VIII

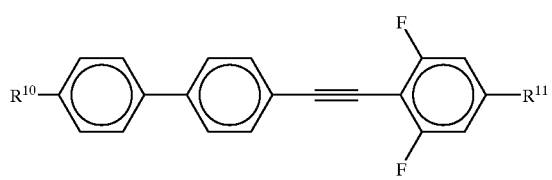

VIII in which $R^{10}$ and $R^{11}$ are each, independently of one another, straight-chain alkyl or alkoxy; preferably alkyl, having 1 to 7 carbon atoms;

The medium additionally comprises one or more compounds of the formula IX

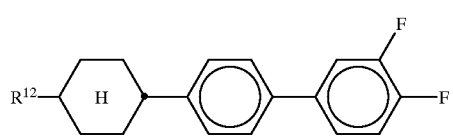

IX in which $R^{12}$ has one of the meanings indicated for $R^1$.

The medium additionally comprises one or more compounds of negative dielectric anisotropy selected from the group consisting of the formulae X, XI and XII:

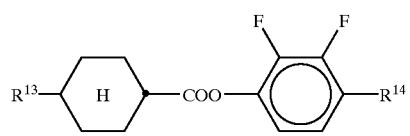

X

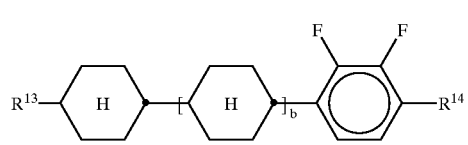

XI

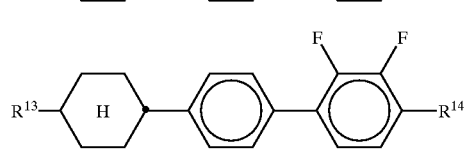

XII in which $R^{13}$ and $R^{14}$ each, independently of one another, have one of the meanings indicated for $R^1$, and b is 0 or 1. $R^{13}$ and $R^{14}$ are preferably straight-chain alkyl or alkoxy having 1 to 7 carbon atoms, furthermore alkenyl or alkenyloxy having up to 7 carbon atoms. In particular, $R^{13}$ is preferably alkyl and $R^{14}$ is preferably alkoxy.

The medium additionally comprises one or more difluorostilbenes of the formula XIII,

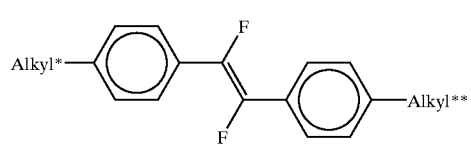

XIII in which

Alkyl* and Alkyl** are a straight-chain alkyl radical having 1 to 6 carbon atoms, preferably 2 to 5 carbon atoms.

The % proportion of the difluorostilbenes in the mixture according to the invention is from 0 to 30% by weight, preferably from 0 to 20% by weight, in particular from 0 to 15% by weight.

The medium additionally comprises one or more compounds of the formula XIV

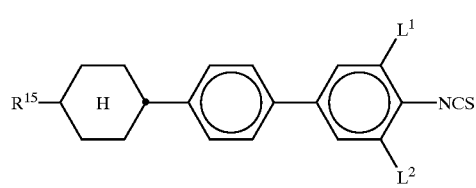

XIV in which $R^{15}$ is as defined for $R^1$, and $L^1$ and $L^2$ are each, independently of one another, H or F.

The proportion of the compounds of the formula XIV in the mixture according to the invention is from 0 to 30% by weight, preferably from 0 to 20% by weight, in particular from 0 to 15% by weight.

The medium additionally comprises one or more compounds of the formula XV

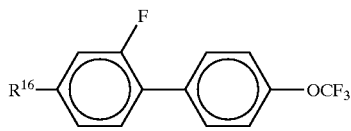

XV in which

R$^{16}$ is as defined for R$^1$, preferably is straight-chain alkyl or alkoxy having 1 to 3 carbon atoms.

The % proportion of the biphenyls in the mixture according to the invention is from 0 to 30% by weight, preferably from 0 to 20% by weight, in particular from 0 to 15% by weight.

Preference is given to displays containing liquid-crystal mixtures comprising one or more cyano compounds selected from the group comprising the formulae IIa, IIb, IId, IIg and IIk, in particular compounds of the formulae IIb, IIg and IIk in which L$^2$ is F, and compounds of the formula III in which L$^2$ is H, one or more dioxane compounds selected from the group comprising the formulae IIk and III, in particular of the formula III in which L$^2$ s F, one or more 3,4,5-trifluorophenyl compounds selected from the group comprising the formulae IIIc, IIIf, IIIg and IIIh, one or more compounds selected from the group comprising the formulae IVb, IVh, IVk and IVm. R$^4$ and R$^5$ are preferably straight-chain alkyl having 1 to 7 carbon atoms.

In the compounds of the formula IVb, R$^5$ is preferably alkoxy having 1 to 5 carbon atoms. In the compounds of the formula IVj, L is preferably F, one or more compounds selected from the group comprising the formulae Va, Vb, Vd and Ve, one or more alkenyl compounds selected from the group comprising the formulae VIa, VIb, VIe and VIf,
in the compounds of the formula VIa, y and z are particularly preferably 0 or 1,
in the compounds of the formula VIb, z is preferably 0,
in the compounds of the formula VIe, k is preferably 0,
in the compounds of the formula VIf, L is preferably F, and y and z are preferably 0.

Preference is furthermore given to a liquid-crystal display according to the invention in which the pixels are addressed by means of an active matrix.

The invention furthermore relates to a liquid-crystalline medium of positive dielectric an isotropy comprising at least one compound of the formula 1, at least one compound selected from the group consisting of the compounds of the formulae IIa to IIp, IIIa to IIIo and Va to Vk, at least one compound selected from the group consisting of the compounds of the formulae VIa to VIf, and, if desired, one or more compounds selected from the group consisting of the compounds of the formulae IVa to Ivn.

Particular preference is given to mixtures which comprise

| | |
|---|---|
| from 2 to 40% by weight, | preferably from 3 to 30% by weight, particularly preferably from 3 to 25% by weight, of at least one compound of the formula I, |
| from 15 to 85% by weight, | preferably from 20 to 65% by weight, of at least one compound selected from the group consisting of the compounds of the formulae II and III, |
| from 0 to 60% by weight, | preferably from 5 to 45% by weight, of at least one compound of the formula IV, |
| from 0 to 40% by weight, | preferably from 5 to 35% by weight, particularly preferably from 10 to 25% by weight, of at least one compound of the formula V, |
| from 0 to 55% by weight, | preferably from 5 to 45% by weight, of at least one compound of the formula VI. |

The liquid-crystalline media used in accordance with the invention generally have a birefringence ($\Delta n$) of <0.14, preferably in the range from 0.06 to 0.13, in particular in the range from 0.09 to 0.12; with clearing points of from 60 to 95° C., in particular from 65 to 85° C.

The flow viscosity $\nu_{20}$ (at 20° C.) of the mixtures used in accordance with the invention is generally less than 30 mm$^2$·s$^{-1}$, in particular between 15 and 25 mm$^2$·s$^{-1}$. The specific resistance of the materials according to the invention is generally, at 20° C., from $5\times10^{10}$ to $5\times10^{14}$ $\Omega$·cm, the values are particularly preferably from $5\times10^{11}$ to $5\times10^{13}$ $\Omega$·cm. The rotational viscosity $\gamma_1$ of the mixtures according to the invention is, at 20° C., preferably less than 80 mPa·s, in particular less than 65 mPa·s.

The clearing point of the media used in accordance with the invention is greater than 60° C., preferably greater than 65° C. and particularly preferably 70° C. or greater. In particular, the clearing point is in the range from 60° C. to 85° C.

The shelf life in test cells, determined as described below, is 1000 hours or more at −30° C., preferably 500 hours or more at −40° C. and very particularly preferably 1000 hours or more at −40° C.

The media used in accordance with the invention consist of from 5 to 30 compounds, preferably of from 6 to 20 compounds and particularly preferably of from 7 to 16 compounds. The mixtures according to the invention preferably comprise one or two compounds of the formula I.

It has been found that even a relatively low proportion of compounds of the formula I in a mixture with conventional liquid-crystal materials, but in particular with one or more compounds selected from the group consisting of the compounds of the formulae IIa to IIp and/or from the group consisting of the compounds of the formulae IVa to IVn, results in a significant lowering of the threshold voltage, in very low rotational viscosity values $\gamma_1$ and in fast response times, with, in particular, broad nematic phases with low smectic-nematic transition temperatures being observed. The compounds of the formulae I to VI are colourless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are preferred.

The term "alkenyl" covers straight-chain and branched alkenyl groups having 2–7 carbon atoms, in particular the straight-chain groups. Particularly preferred alkenyl groups are C$_2$–C$_7$-1E-alkenyl, C$_4$–C$_7$-3E-alkenyl, C$_5$–C$_7$-4-alkenyl, and C$_6$–C$_7$-5-alkenyl and C$_7$-6-alkenyl, in particular $C_2$–$C_7$-1 E-alkenyl, $C_4$–$C_7$-3E-alkenyl and $C_5$–$C_7$-4-alkenyl. Examples of very particularly preferred alkenyl groups are vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "alkoxyalkyl" preferably covers straight-chain radical s of the formula $C_nH_{2n+1}$—O—$(CH_2)_m$, in which n and m are each, independently of one another, from 1 to 6. Preferably, m=1 and n is from 1 to 4.

Through a suitable choice of the meanings of $R^1$ to $R^{14}$, the addressing times, the threshold voltage, the steepness of the transmission characteristic lines, etc., can be modified in the desired manner. For example, 1E-alkenyl radicals, 3E-alkenyl radicals 2E-alkenyloxy radicals and the like generally result in shorter addressing times, improved nematic tendencies and a higher ratio of the elastic constants $k_{33}$ (bend) and $k_{11}$ (splay) compared with alkyl and alkoxy radicals. 4-alkenyl radicals, 3-alkenyl radicals and the like generally give lower threshold voltages and smaller values of $k_{33}/k_{11}$ compared with alkyl and alkoxy radicals.

The optimum mixing ratio of the compounds of the formulae I–VI depends substantially on the desired properties, on the choice of the components of the formulae I, II, III, IV, V and/or VI and on the choice of any further components present. Suitable mixing ratios within the range indicated above can easily be determined from case to case.

The total amount of compounds of the formulae I to VI in the mixtures according to the invention is not crucial. The mixtures preferably chain of 50–90% a weight of compounds of the formulae I to VI. The mixtures may also comprise one or more further components in order to optimise various properties. However, the observed effect, particularly on the low-temperature stability, is generally greater the higher the total concentration of compounds of the formulae I to VI.

The liquid-crystalline media according to the invention preferably comprise from 2 to 40, in particular from 4 to 30, compounds as further constituents besides one or more compounds of the formula I. These media very particularly preferably comprise from 7 to 25 compounds besides one or more compounds of the formula I. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexane-carboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of, cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexyl-cyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterised by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are each, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr, E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller sub-group of the compounds of the formulae 1, 2, 3, 4 and 5, R' and R" are each, independently of one another, alkyl, alkenyl, alkoxy, alkoxyalkyl, alkenyloxy or alkanoyloxy having up to 8 carbon atoms. This smaller sub-group is called group A below, and the compounds are referred to by the sub-formulae 1 a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is known as group B, R" is —F, —Cl, —NCS or —(O)$_i$CH$_{3-(k+l)}$F$_k$Cl$_l$, where i is 0 or 1, and k+l is 1, 2 or 3; the compounds in which R" has this meaning are referred to by the sub-formulae 1b, 2b, 3b, 4b and 5b. Particular preference is given to those compounds of the sub-formulae 1 b, 2b, 3b, 4b and 5b in which R" is —F, —Cl, —NCS, —CF$_3$, SF$_5$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is referred to below as group C, and the compounds of this sub-group are correspondingly described by sub-formulae 1c, 2c, 3c, 4c and 5c. In the compounds of the sub-formulae 1 c, 2c, 3c, 4c and 5c, R' is as defined for the compounds of the sub-formulae 1 a–5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides the compounds of the formula I to VI, the media according to the invention preferably comprise one or more compounds selected from group A and/or group B and/or group C. The proportions by weight of the compounds from these groups in the media according to the invention are preferably

| | |
|---|---|
| group A: | from 0 to 90%, preferably from 20 to 90%, in particular from 30 to 90% |
| group B: | from 0 to 80%, preferably from 10 to 80%, in particular from 10 to 65% |
| group C: | from 0 to 80%, preferably from 5 to 80%, in particular from 5 to 50%, | the sum of the proportions by weight of the group A and/or B and/or C compounds present in the respective media according to the invention preferably being from 5% to 90% and in particular from 10% to 90%.

The structure of the IPS display according to the invention corresponds to the usual design for displays of this type, as described, for example, in WO 91/10936 or EP 0 588 568. The term usual design is broadly drawn here and also covers all derivatives and modifications of the IPS display, in particular, for example, also matrix display elements based on poly-Si TFT or MIM.

However, an essential difference of the displays according to the invention from those usual hitherto consists in the choice of the liquid-crystal parameters of the liquid-crystal layer.

The liquid-crystal mixtures which can be used in accordance with the invention are prepared in a manner conventional per se. In general, the desired amount of the components used in smaller amount is dissolved in the components making up the principal constituent, advantageously at elevated temperature. It is also possible to prepare the mixtures in other conventional manners, for example by use of pre-mixtures, for example homologue mixtures, or using so-called "multibottle" systems .

The dielectrics may also comprise further additives known to the person skilled in the art for described in the literature. For example, 0–15% preferably 0–10%, of pleochroic dyes and/or chiral dopants may be added. The individual compounds added are employed in concentrations of from 0.01 to 6% and preferably from 0.1 to 3%. However, the concentrations given here for the other constituents of the liquid-crystal mixtures, i.e. the liquid-crystalline or mesogenic compounds, are indicated without taking into account the concentration of these additives.

The physical properties of the liquid-crystal mixtures are determined in accordance with "Physical Properties of Liquid Crystals" Ed. W. Becker, Merck KGaA, as of Nov. 1997, unless explicitly stated otherwise.

C denotes a crystalline phase, S a smectic phase, $S_C$ a smectic C phase, $S_A$ a smectic A phase, N a nematic phase and I the isotropic phase.

$V_0$ denotes the capacitive threshold voltage. $\Delta n$ denotes the optical anisotropy, and $n_0$ the ordinary refractive index (in each case at 589 nm). $\Delta\epsilon$ denotes the dielectric anisotropy ($\Delta\epsilon=\epsilon_\parallel-\epsilon_\perp$, where $\epsilon_\parallel$ denotes the dielectric constant parallel to the longitudinal molecular axes and $\epsilon_\perp$ denotes the dielectric constant perpendicular thereto, in each case at 1 kHz). The electro-optical data were measured in a planar cell at 20° C., unless expressly stated otherwise. All physical properties are indicated and measured at 20° C., unless expressly stated otherwise.

The cells are preferably bright in the "off" state.

The examples below are intended to illustrate the invention without representing a limitation. Above and below, percentages are per cent by weight. All temperatures are indicated in degrees Celsius. $\Delta n$ denotes optical anisotropy (589 nm, 20° C), $\Delta\epsilon$ denotes the dielectric anisotropy (1 kHz, 20° C.), H.R. denotes the voltage holding ratio (at 100° C., after 5 minutes in an oven at 1 V). The capacitive threshold voltage $V_0$ was determined at 20° C. and 1 kHz.

The calibrated rotational viscometer gave a rotational viscosity $\gamma_1$ for ZLI-4792 (Merck KGaA) of 133 mPa·s at 20° C.

The shelf life was investigated in sealed test cells with an optical retardation of about 0.5 μm with CU-1511 from DuPont, USA, as alignment layer. To this end, in each case five test cells were bonded on both sides to crossed polarisers and stored at fixed temperatures of 0° C., –10° C., –20° C., –30° C. and –40° C. At intervals of 24 hours in each case, the cells were assessed visually for changes. The storage time noted at the respective temperature $t_{store}$ (T) was the final time at which a change was just not observed in any cell.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n, respectively m, carbon atoms. The coding in Table B is self-evident. In Table A, only the acronym for the parent structure is indicated, followed in individual cases, separated from the acronym for the parent structure by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | C≡C—$C_mH_{2m+1}$ | H | H |
| nF.F.F | $C_nH_{2n+1}$ | F | F | F |
| nCl.F.F | $C_nH_{2n+1}$ | Cl | F | F |
| $nCF_3$.F.F | $C_nH_{2n+1}$ | $CF_3$ | F | F |
| $nOCF_3$.F.F | $C_nH_{2n+1}$ | $OCF_3$ | F | F |
| $nOCF_2$.F.F | $C_nH_{2n+1}$ | $OCHF_2$ | F | F |
| $nOCF_3$.F | $C_nH_{2n+1}$ | $OCF_3$ | F | H |

Preferred displays contain media comprising one or more compounds from Tables A and B in addition to one or more compounds of the formula I.

TABLE A
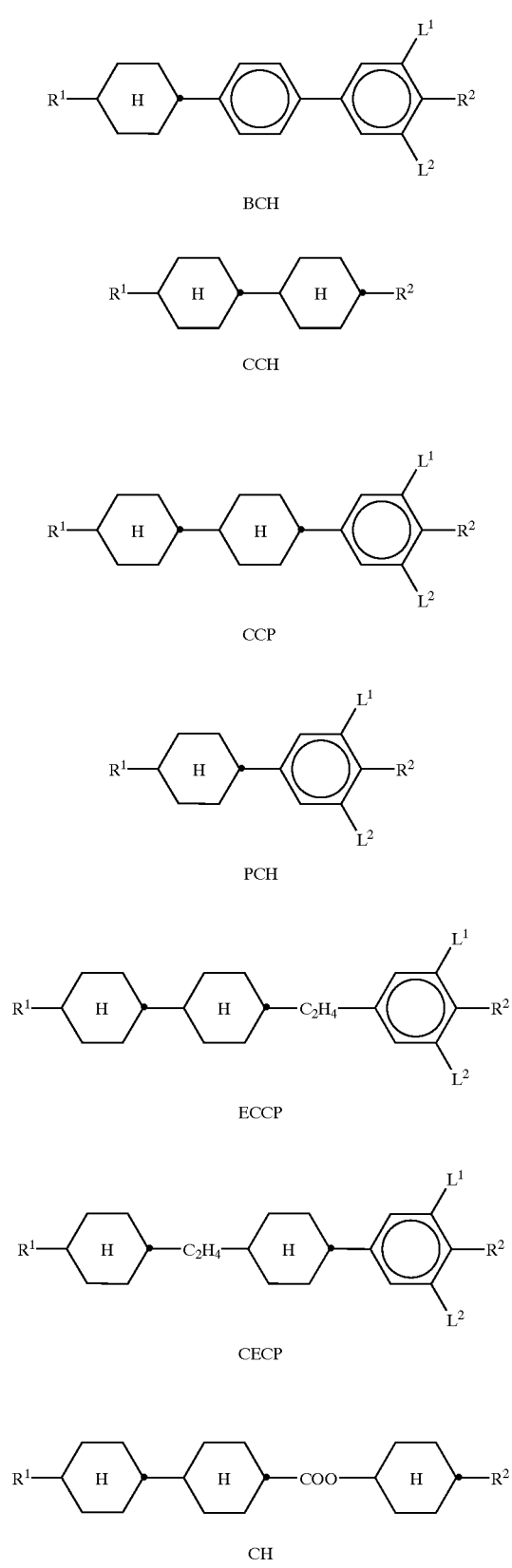
TABLE A-continued
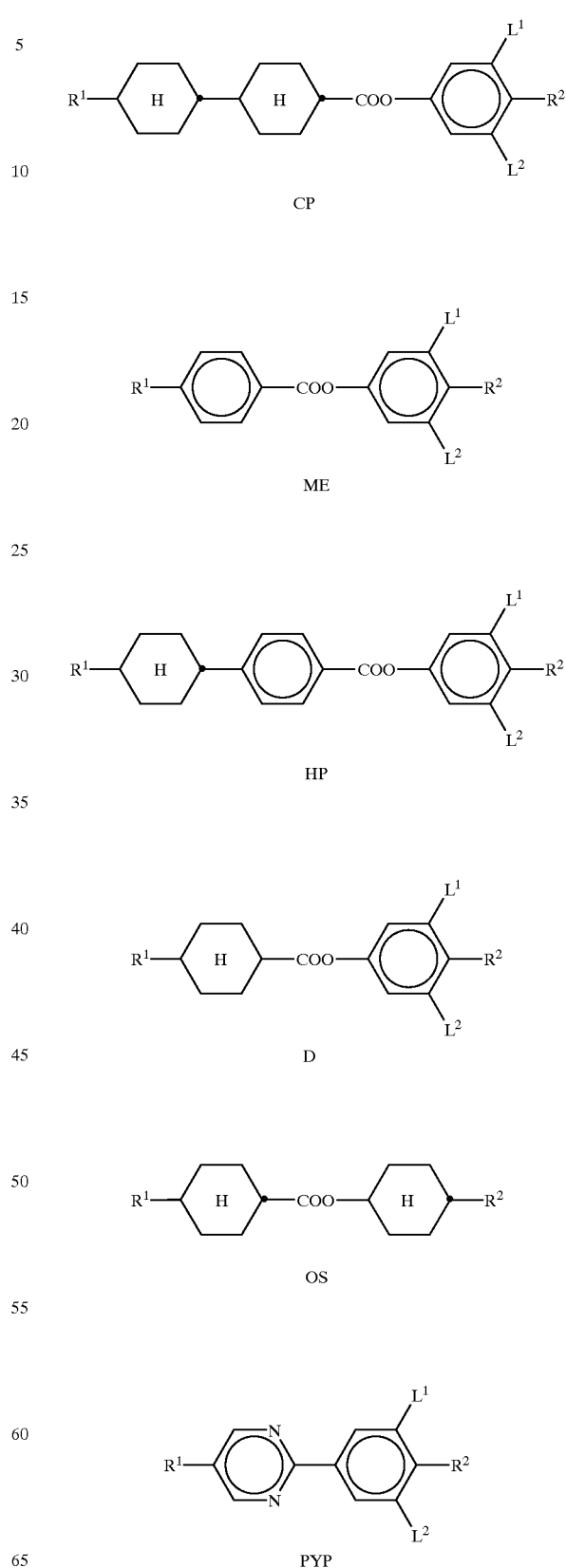

TABLE A-continued
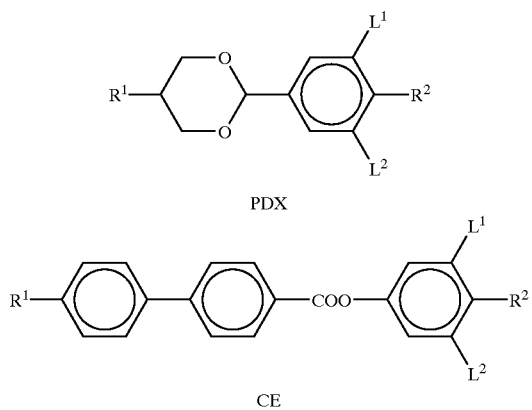
PDX
CE
TABLE A-continued
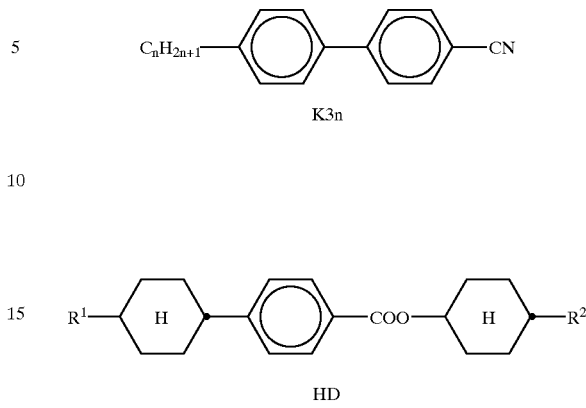
K3n
HD
TABLE B
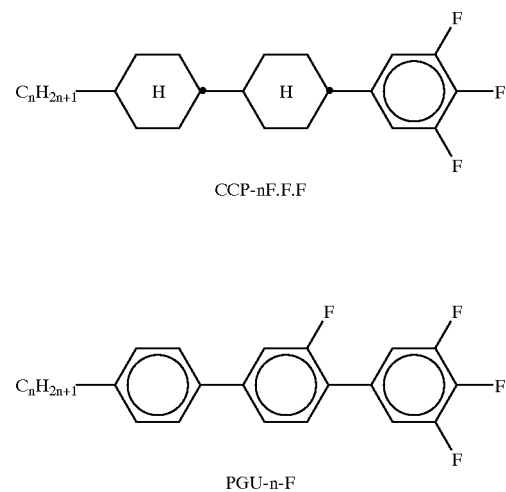
CCP-nF.F.F
PGU-n-F
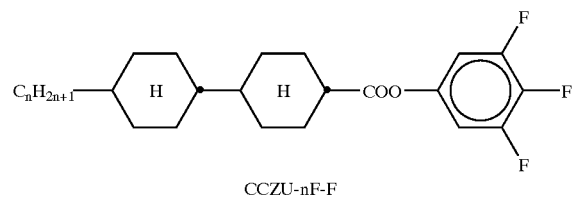
CCZU-nF-F
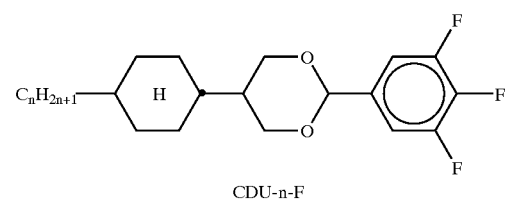
CDU-n-F TABLE B-continued
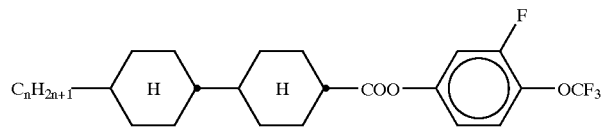
CCZG-n-OT
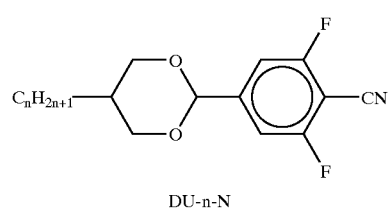
DU-n-N
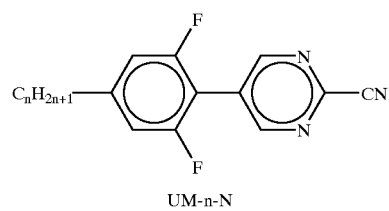
UM-n-N
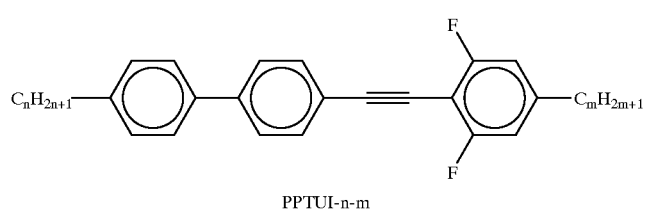
PPTUI-n-m
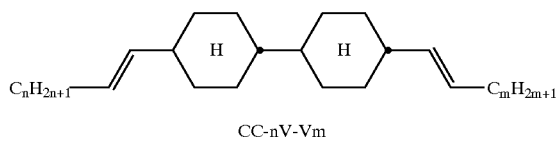
CC-nV-Vm
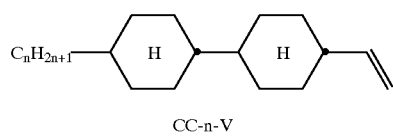
CC-n-V
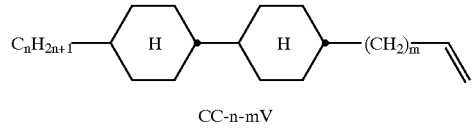
CC-n-mV
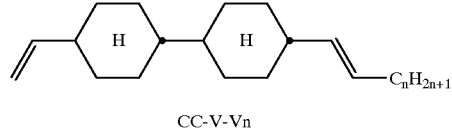
CC-V-Vn
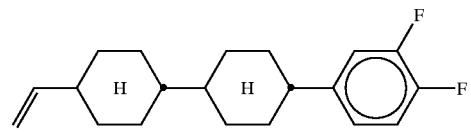
CCG-V-F TABLE B-continued
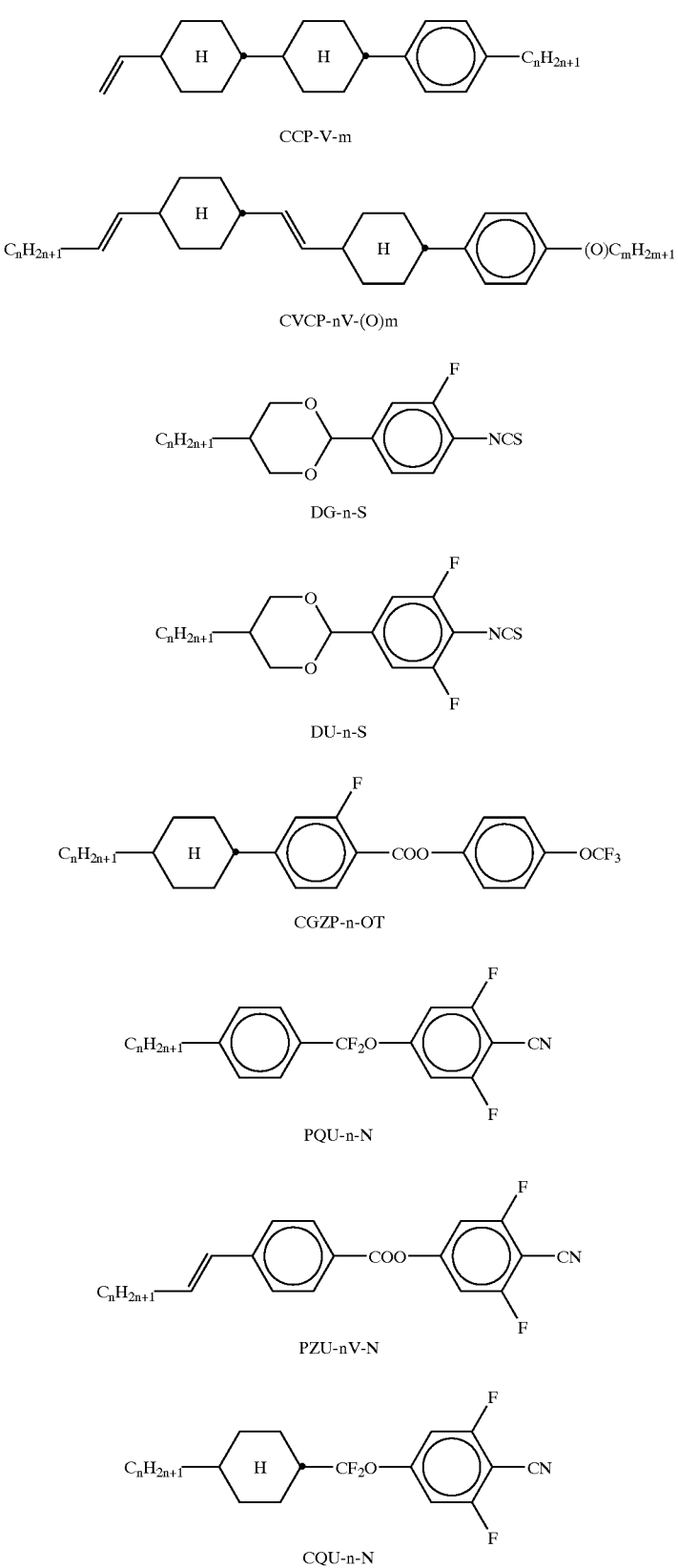

TABLE B-continued
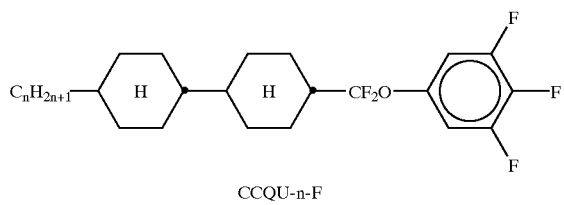
CCQU-n-F
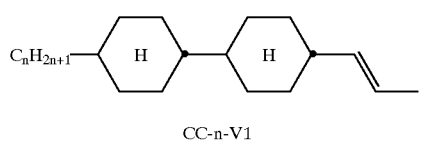
CC-n-V1
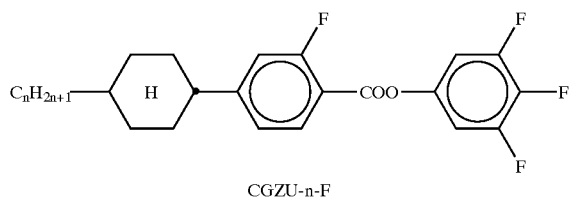
CGZU-n-F
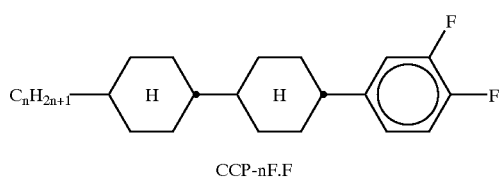
CCP-nF.F
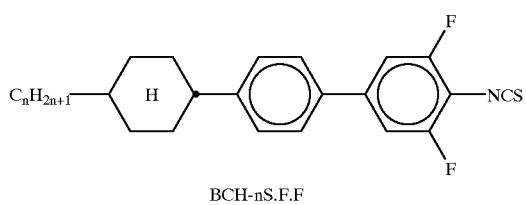
BCH-nS.F.F
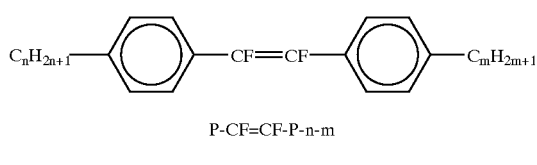
P-CF=CF-P-n-m
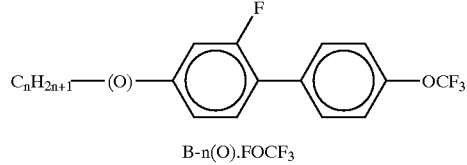
B-n(O).FOCF$_3$
TABLE C
Table C shows dopants which are usually employed in the mixtures according to the invention
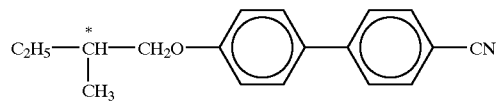
C 15

TABLE C-continued
Table C shows dopants which are usually employed in
the mixtures according to the invention
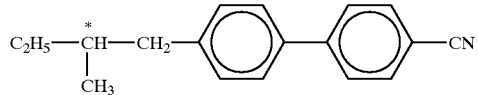
CB 15
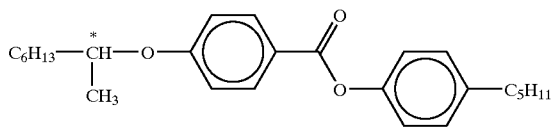
CM 21
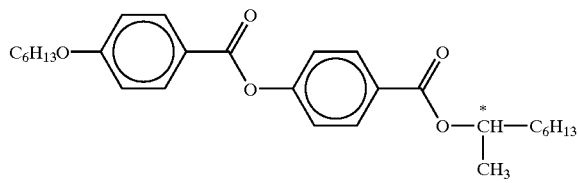
R/S-811
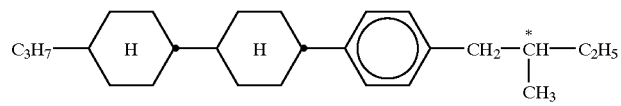
CM 44
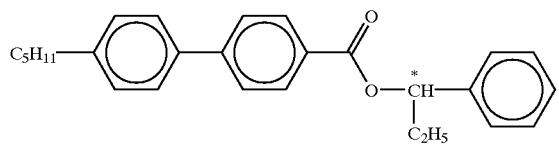
CM 45
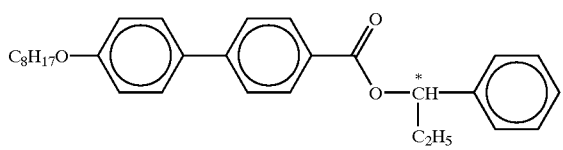
CM 47
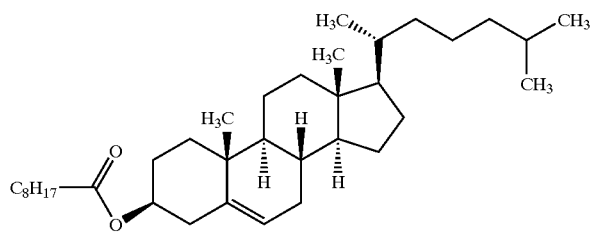
CN

TABLE C-continued

Table C shows dopants which are usually employed in the mixtures according to the invention

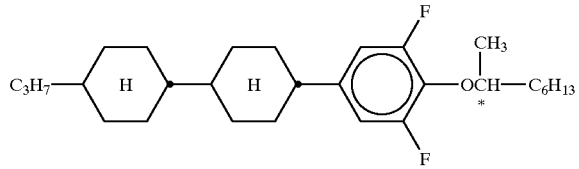

R/S-2011

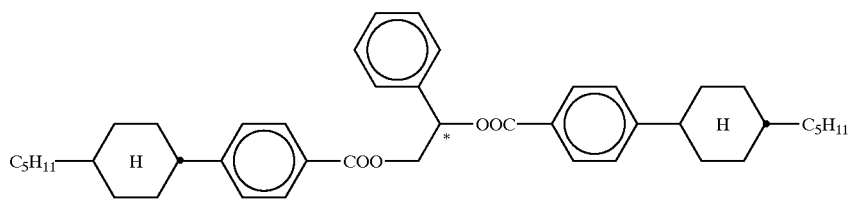

R/S-1011

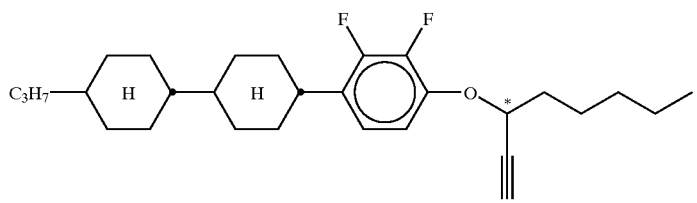

R/S-3011

EXAMPLE 1

| An IPS display contains a nematic mixture having | |
|---|---|
| CC-3-V | 19.0% |
| CC-3-V1 | 9.0% |
| CCH-35 | 5.0% |
| PDX-3 | 5.0% |
| ME2N.F | 4.0% |
| CCP-V-1 | 16.0% |
| CCP-20CF$_3$ | 7.0% |
| CCP-30CF$_3$ | 8.0% |
| DU-2-S | 9.0% |
| DU-3-S | 10.0% |
| CGZP-3-OT | 3.0% |
| BCH-32 | 4.0% |
| CBC-33 | 1.0% |
| Clearing point [° C.]: | +69.5 |
| Δn [589 nm; 20° C.]: | +0.1006 |
| Δε [1 kHz; 20° C.]: | +9.2 |
| γ$_1$ [mPa · s; 20° C.]: | 62 |
| V$_0$ [20° C.]: | 1.18 V |

EXAMPLE 2

| An IPS display contains a nematic mixture having | |
|---|---|
| CC-3-V | 19.0% |
| CC-3-V1 | 8.0% |
| CCH-35 | 5.0% |
| PDX-3 | 5.0% |
| ME2N.F | 4.0% |
| CCP-V-1 | 16.0% |
| CCP-20CF$_3$ | 6.0% |
| CCP-30CF$_3$ | 7.0% |
| CCG-V-F | 6.0% |
| DU-2-S | 9.0% |
| DU-3-S | 10.0% |
| CGZP-3-OT | 5.0% |
| Clearing point [° C.]: | +65.5 |
| Δn [589 nm; 20° C.]: | +0.0965 |
| Δε [1 kHz; 20° C.]: | +9.7 |
| γ$_1$ [mPa · s; 20° C.]: | 59 |
| V$_0$ [20° C.]: | 1.18 V |

EXAMPLE 3

| An IPS display contains a nematic mixture having | |
|---|---|
| CC-3-V | 19.0% |
| CC-3-V1 | 9.0% |
| CCH-35 | 5.0% |
| PDX-3 | 5.0% |
| ME2N.F | 3.5% |
| CCP-V-1 | 15.0% |
| CCP-20CF$_3$ | 7.5% |
| CCP-30CF$_3$ | 7.0% |
| DU-2-S | 10.0% |
| DU-3-S | 8.0% |

-continued

| An IPS display contains a nematic mixture having | |
|---|---|
| CGZP-2-OT | 5.0% |
| BCH-32 | 5.0% |
| CBC-33 | 1.0% |

EXAMPLE 4

| An IPS display contains a nematic mixture having | |
|---|---|
| CC-3-V | 19.0% |
| CC-3-V1 | 8.0% |
| CC-5-V | 5.0% |
| PDX-3 | 5.0% |
| ME2N.F | 4.0% |
| CCP-V-1 | 16.0% |
| CCP-20CF$_3$ | 6.0% |
| CCP-30CF$_3$ | 7.0% |
| CCG-V-F | 6.0% |
| DU-2-S | 9.0% |
| DU-3-S | 10.0% |
| CGZP-3-OT | 5.0% |

EXAMPLE 5

| An IPS display contains a nematic mixture having | |
|---|---|
| CC-3-V | 19.0% |
| CC-3-V1 | 8.0% |
| CCH-35 | 5.0% |
| PDX-3 | 5.0% |
| ME2N.F | 4.0% |
| CCP-V-1 | 16.0% |
| CCP-20CF$_3$ | 6.0% |
| CCP-30CF$_3$ | 7.0% |
| DU-2-S | 9.0% |
| DU-3-S | 10.0% |
| CGZP-3-OT | 5.0% |
| BCH-32 | 6.0% |

EXAMPLE 6

| An IPS display contains a nematic mixture having | | | |
|---|---|---|---|
| CC-3-V1 | 9.0% | | |
| CC-5-V | 9.0% | | |
| CC-3-V | 18.0% | | |
| B-10.F0CF$_3$ | 5.0% | | |
| P-CF=CF-P-3-3 | 6.0% | | |
| DU-2-S | 15.0% | | |
| PGU-2-F | 7.0% | | |
| BCH-32 | 6.0% | | |
| CCP-V-1 | 15.0% | | |
| BCH-2S.F.F | 10.0% | | |
| S → N [° C.]: | <−40 | | |
| Clearing point [° C.]: | +65.0 | | |
| Δn [589 nm; 20° C.]: | +0.1288 | | |
| Δε [1 kHz; 20° C.]: | +7.0 | | |
| γ$_1$ [mPa · s; 20° C.]: | 50 | | |

EXAMPLE 7

| An IPS display contains a nematic mixture having | | | |
|---|---|---|---|
| CC-3-V | 19.0% | Δn [589 nm; 20° C.]: | +0.1013 |
| CC-3-V1 | 9.0% | Δε [1 kHz; 20° C.]: | +8.7 |
| CCH-35 | 5.0% | γ$_1$ [mPa · s; 20° C.]: | 64 |
| CGZP-2-OT | 5.5% | V$_0$ [20° C.]: | 1.16 V |
| PDX-3 | 7.0% | | |
| ME2N.F | 2.0% | | |
| CCZU-2-F | 6.0% | | |
| DU-2-S | 10.0% | | |
| DU-3-S | 8.0% | | |
| CCP-30CF$_3$ | 6.0% | | |
| CCP-V-1 | 15.0% | | |
| BCH-32 | 6.0% | | |
| CBC-33 | 1.5% | | |

EXAMPLE 8

| An IPS display contains a nematic mixture having | | | |
|---|---|---|---|
| CC-3-V | 19.0% | Clearing point [° C.]: | +70.9 |
| CC-3-V1 | 9.0% | Δn [589 nm; 20° C.]: | +0.0985 |
| CC-5-V | 4.0% | Δε [1 kHz; 20° C.]: | +7.2 |
| CCH-35 | 4.0% | γ$_1$ [mPa · s; 20° C.]: | 51 |
| PCH-301 | 2.0% | | |
| PDX-3 | 2.0% | | |
| K6 | 2.0% | | |
| DU-2-S | 10.0% | | |
| DU-3-S | 8.0% | | |
| CCP-20CF$_3$ | 8.0% | | |
| CCP-30CF$_3$ | 5.0% | | |
| CGZP-2-OT | 7.0% | | |
| CCP-V-1 | 15.0% | | |
| BCH-32 | 5.0% | | |

EXAMPLE 9

| An IPS display contains a nematic mixture having | | | |
|---|---|---|---|
| CC-3-V | 19.5% | Clearing point [° C.]: | +72.3 |
| CC-3-V1 | 9.0% | Δn [589 nm; 20° C.]: | +0.0997 |
| CCH-35 | 5.0% | Δε [1 kHz; 20° C.]: | +9.1 |
| PDX-3 | 6.5% | γ$_1$ [mPa · s; 20° C.]: | 56 |
| ME2N.F | 3.5% | | |
| CCP-V-1 | 15.0% | | |
| CCP-20CF$_3$ | 8.0% | | |
| CCP-30CF$_3$ | 7.0% | | |
| DU-2-S | 9.0% | | |
| DU-3-S | 8.0% | | |
| CGZP-2-OT | 3.5% | | |
| BCH-32 | 5.0% | | |
| CBC-33 | 1.0% | | |

EXAMPLE 10

| An IPS display contains a nematic mixture having | | | |
|---|---|---|---|
| CC-3-V1 | 10.0% | Clearing point [° C.]: | +69.9 |
| CC-3-V | 19.0% | Δn [589 nm; 20° C.]: | +0.1000 |
| CC-5-V | 5.0% | Δε [1 kHz; 20° C.]: | +7.3 |
| CCH-35 | 5.0% | γ$_1$ [mPa · s; 20° C.]: | 50 |
| PCH-301 | 2.0% | | |
| DU-2-S | 8.0% | | |

-continued

| An IPS display contains a nematic mixture having | |
|---|---|
| DU-3-S | 8.0% |
| PDX-3 | 3.0% |
| K6 | 4.0% |
| CGZP-2-OT | 8.0% |
| CCP-30CF$_3$ | 8.0% |
| BCH-32 | 5.0% |
| CCP-V-1 | 15.0% |

EXAMPLE 11

| An IPS display contains a nematic mixture having | | | |
|---|---|---|---|
| CC-3-V1 | 28.0% | Clearing point [° C.]: | +79.8 |
| CCH-35 | 5.0% | Δn [589 nm; 20° C.]: | +0.1056 |
| PDX-3 | 5.0% | Δε [1 kHz; 20° C.]: | +9.7 |
| ME2N.F | 4.0% | γ$_1$ [mPa · s; 20° C.]: | 68 |
| CCP-V-1 | 16.0% | | |
| CCP-20CF$_3$ | 7.0% | | |
| CCP-30CF$_3$ | 8.0% | | |
| DU-2-S | 19.0% | | |
| CGZP-3-OT | 3.0% | | |
| BCH-32 | 4.0% | | |
| CBC-33 | 1.0% | | |

What is claimed is:

1. An electro-optical liquid-crystal display having a realignment layer for realignment of the liquid crystals whose field has a component parallel to the liquid-crystal layer that is crucial for the realignment, containing a liquid-crystalline medium of positive dielectric anisotropy, wherein said the medium comprises one or more compounds of formula I

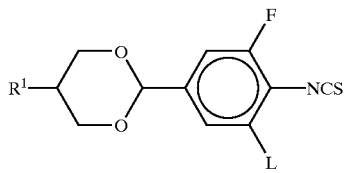

in which

R$^1$ is an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may each, independently of one another, be replaced by —O—, —S—,

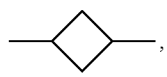

—CO—, —CO—O—, —O—CO— or —O—CO—O— in such a way that O atoms are not linked directly to one another, and L is H or F.

2. A liquid-crystal display according to claim 1, wherein said medium additionally comprises at least one compound of formula II:

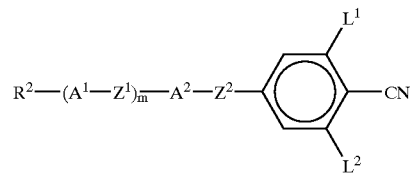

in which

R$^2$ is H, an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may also each, independently of one another, be replaced by —O—, —S—,

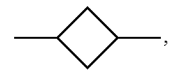

—CO—, —CO—O—, —O—CO— or —O—CO—O— in such a way that O atoms are not linked directly to one another, A$^1$ and A$^2$ are each, independently of one another,
  (a) a trans-1,4-cyclohexylene radical or 1,4-cyclohexenylene radical, in which, in addition, one or more non-adjacent CH$_2$ groups may be replaced by —O— and/or —S—,
  (b) a 1,4-phenylene radical, in which, in addition, one or two CH groups may be replaced by N,
  (c) a radical from the group consisting of 1,4-bicyclo[2.2.2]octylene, piperidine-1,4-diyl, naphthalene-2,6-diyl, decahydronaphthalene-2,6diyl and 1,2,3,4-tetrahydronaphthalene-2,-diyl,
  where the radicals (a), (b) and (c) may be substituted by one or two fluorine atoms, Z$^1$ and Z$^2$ are each, independently of one another, —CO—O—, —O—CO—, —CH$_2$O—, —OCH$_2$—, —CH$_2$CH$_2$—, —CH=CH—, —C≡C—, —CHF—CHF—, —CF=CF—, —CF$_2$O—, —OCF$_2$—, —CF$_2$CF$_2$— or a single bond, and one or the radicals Z$^1$ and Z$^2$ is alternately —(CH$_2$)$_4$— or —CH=CH—CH$_2$CH$_2$—, L$^1$ and L2 are each, independently of one another, H or F, and m is 0, 1 or 2.

3. A liquid-crystal display according to claim 1, wherein said medium additionally comprises at least one compound of formula III

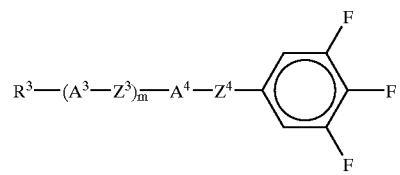

in which

R$^3$ is H, an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may also each, independently of one another, be replaced by —O—, —S—,

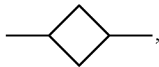

—CO—, —CO—O—, —O—CO— or —O—CO—O— in such a way that O atoms are not linked directly to one another, $A^3$ and $A^4$ are each, independently of one another,
(a) a trans-1,4-cyclohexylene radical or 1,4-cyclohexenylene radical, in which, in addition, one or more non-adjacent $CH_2$ groups may be replaced by —O— and/or —S—,
(b) a 1,4-phenylene radical, in which, in addition, one or two CH groups may be replaced by N,
(c) a radical from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl,
where the radicals (a), (b) and (c) may be substituted by one or two fluorine atoms, $Z^3$ and $Z^4$ are each, independently of one another, —CO—O—, —O—CO—, —$CH_2$O—, —O$CH_2$—, —$CH_2CH_2$—, —CH=CH—, —C≡C—, —CHF=CHF—, —CF=CF—, —$CF_2$O—, —O$CF_2$—, —$CF_2CF_2$— or a single bond, and one or the radicals $Z^3$ and $Z^4$ is alternatively —$(CH_3)_4$— or —CH=CH—$CH_2CH_2$—, and n is 0, 1 or 2.

4. A liquid-crystal display according to claim 1, wherein said medium additionally comprises at least one compound of formula IV $$R^4\text{-}(A^5\text{-}Z^5)_o\text{-}A^6\text{-}R^5 \qquad IV$$

in which
$R^4$ and $R^5$ are each, independently of one another, H, an alkyl or alkenyl radical having up to 15 carbon atoms which is unsubstituted, monosubstituted by CN or $CF_3$ or at least monosubstituted by halogen and in which, in addition, one or more $CH_2$ groups in these radicals may also each, independently of one another, be replaced by —O—, —S—,

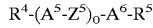

—CO—, —CO—O—, —O—CO— or —O—CO—O— in such a way that O atoms are not linked directly to one another, $A^5$ and $A^6$ are each, independently of one another,
(a) a trans-1,4-cyclohexylene radical or 1,4-cyclohexenylene radical, in which, in addition, one or more non-adjacent $CH_2$ groups may be replaced by —O— and/or —S—,
(b) a 1,4-phenylene radical, in which, in addition, one or two CH groups may be replaced by N,
(c) a radical from the group consisting of 1,4-bicyclo[2.2.2]octylene, piperidine-1,4,diyl, naphthalene-2,6-diyl, decahydronaphthalene-2,6-diyl and 1,2,3,4-tetrahydronaphthalene-2,6-diyl,
where the radicals (a), (b) and (c) may be substituted by one or two fluorine atoms, each $Z^5$, independently, is —CO—O—, —O—CO—, —$CH_2$O—, —O$CH_2$—, —$CH_2CH_2$—, —CH=CH—, —C≡C—, —CHF—CHF—, —CF=CF—, —$CF_2$O—, —O$CF_2$—, —$CF_2CF_2$— or a single bond, and one or the $Z^5$ is alternatively —$(CH_2)_4$— or —CH=CH—$CH_2CH_2$—, and o is 1, 2 or 3.

5. A liquid-crystal display according to claim 1, wherein said medium additionally comprises at least one compound of formula V

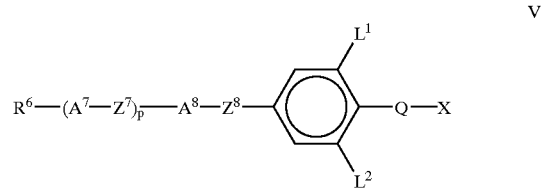

in which
$R^6$ is H, an alkyl or alkenyl radical having up to 15 carbon atoms which is unsubstituted, monosubstituted by CN or $CF_3$ or at least monosubstituted by halogen and in which, in addition, one or more $CH_2$ groups in these radicals may also each, independently of one another, be replaced by —O—, —S—,

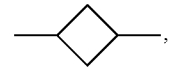

—CO—, —CO—O—, —O—CO— or —O—CO—O— in such a way that O atoms are not linked directly to one another, $A^7$ and $A^8$ are each, independently of one another,
(a) a trans-1,4-cyclohexylene radical or 1,4-cyclohexenylene radical, in which, in addition, one or more non-adjacent $CH_2$ groups may be replaced by —O— and/or —S—,
(b) a 1,4-phenylene radical, in which, in addition, one or two CH groups may be replaced by N,
(c) a radical from the group consisting of 1,4-bicyclo[2.2.2]octylene, piperidine-1,4-diyl, naphthalene-2,6-diyl, decahydronaphthalene-2,6diyl and 1,2,3,4-tetrahydronaphthalene2,6-diyl,
where the radicals (a), (b) and (c) maybe substituted by one or two fluorine atoms, $Z^7$ and $Z^8$ are each, independently of one another, —CO—O—, —O—CO—, —$CH_2$O—, —O$CH_2$—, —$CH_2CH_2$—, —CH=CH—, —C≡C—, —CHF—CHF—, —CF=CF—, —$CF_2$O—, —O$CF_2$—, —$CF_2CF_2$— or a single bond, and one or the radicals $Z^7$ and $Z^8$ is alternatively —$(CH_2)_4$— or —CH=CH—$CH_2CH_2$—, $L^1$ and $L^2$ are each, independently of one another, H or F, Q is a polyfluoroalkylene radical of the formula —(O)$_q$—$(CH_2)_r(CF_2)_s$, —(O)$_q$—(CHF)$_r(CF_2)_s$ or —(O)$_q$—$(CF_2)_r$(CHF)$_s$—$CF_2$—, in which
q is 0 or 1,
r is 0, 1, 2, 3, 4, 5 or 6,
s is 1, 2, 3, 4, 5 or 6,
X is H, F or Cl and
p is 0, 1 or 2.

6. A liquid-crystal display according to claim 1, wherein said medium additionally comprises at least one compound of formula VI

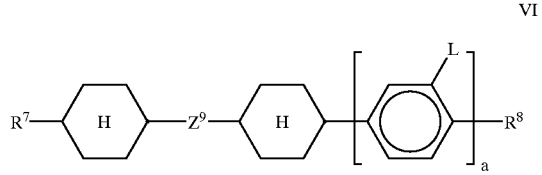  VI in which
R$^7$ is an alkenyl group having 2 to 7 carbon atoms,
Z$^9$ is —CH=CH—, —CH$_2$CH$_2$— or a single bond,
L is H or F,
a is 0 or 1, and
R$^8$ is an alkyl, alkoxy or alkenyl group having up to 12 carbon atoms, in which, in addition, one or two non-adjacent CH$_2$ groups are each optionally replaced by —CO—, —OCO— or —COO—, or, if a is 1, R$^8$ may alternatively be F.

7. A liquid-crystal display according to claim 1, wherein said medium additionally comprises at least one compound of formula II, at least one compound of formula III, or both

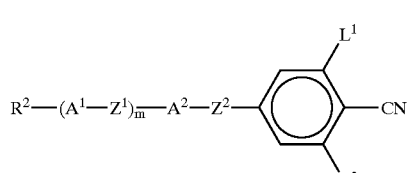  II

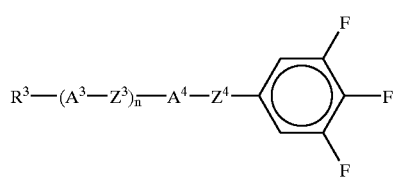  III in which
R$^2$ is H, an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may also each, independently of one another, be replaced by —O—, —S—,

,

—CO—, —CO—O—, —O—CO— or —O—CO—O— in such a way that O atoms are not linked directly to one another,
A$^1$ and A$^2$ are each, independently of one another,
(a) a trans-1,4-cyclohexylene radical or 1,4-cyclohexenylene radical, in which, in addition, one or more non-adjacent CH$_2$ groups may be replaced by —O— and/or —S—,
(b) a 1,4-phenylene radical, in which, in addition, one or two CH groups may be replaced by N, or
(c) a radical from the group consisting of 1,4-bicyclo[2.2.2]octylene, piperidine-1,4-diyl, naphthalene-2,6-diyl, decahydronaphthalene-2,6diyl and 1,2,3,4-tetrahydronaphthalene-2,6-diyl,
where the radicals (a), (b) and (c) may be substituted by one or two fluorine atoms,
Z$^1$ and Z$^2$ are each, independently of one another, —CO—O—, —O—CO—, —CH$_2$O—, —OCH$_2$—, —CH$_2$CH$_2$—, —CH=CH—, —C≡C—, —CHF—CHF—, —CF=CF—, —CF$_2$O—, —OCF$_2$—, —CF$_2$CF$_2$— or a single bond, and one or the radicals Z$^1$ and Z$^2$ is alternatively —(CH$_2$)$_4$— or —CH=CH—CH$_2$CH$_2$—,
L$^1$ and L$^2$ are each, independently of one another, H or F,
m is 0, 1 or 2,
R$^3$ has one of the meanings indicated for R$^2$,
A$^3$ and A$^4$ each, independently of one another, have one of the meanings indicated for A$^1$ and A$^2$,
Z$^3$ and Z$^4$ each, independently of one another, have one of the meanings indicated for Z$^1$ and Z$^2$, and
n is 0, 1 or 2.

8. A liquid-crystal display according to claim 1, wherein pixels within said display are addressed by means of an active matrix.

9. A liquid-crystalline medium of positive dielectric anisotropy comprising two or more liquid-crystalline compounds wherein said medium contains at least one compound according to formula I

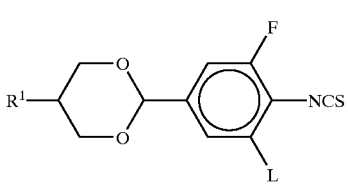  I in which
R$^1$ is an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may each, independently of one another, be replaced by —O—, —S—,

,

—CO—, —CO—O—, —O—CO— or —O—CO—O— in such a way that O atoms are not linked directly to one another, and
L is H or F.

10. In a method of generating an electro-optical effect using a liquid-crystal display, the improvement wherein said display contains a liquid-crystalline medium according to claim 9.

11. A liquid-crystal display according to claim 7, wherein said medium comprises
from 2 to 40% by wt. of at least one compound of formula I,
from 15 to 85% by wt. of at least one compound selected from formulae II and/or III,
from 0 to 60% by wt. of at least one compound of formula IV R$^4$-(A$^5$-Z$^5$)$_o$-A$^6$-R$^5$  IV in which R[4] and R[1] each, independently of one another, H, an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may also each, independently of one another, be replaced by —O—, —S—,

—CO—, —CO—O—, —O—CO— or —O—CO—O in such a way that O atoms are not linked directly to one another, A[5] and A[6] are each, independently of one another,
(a) a trans-1,4-cyclohexylene radical or 1,4-cyclohexenylene radical, in which, in addition, one or more non-adjacent CH$_2$ groups may be replaced by —O— and/or —S—,
(b) a 1,4-phenylene radical, in which, in addition, one or two CH groups may be replaced by N,
(c) a radical from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a), (b) and (c) may be substituted by one or two fluorine atoms, each Z[5], independently, is —CO—O—, —O—CO—, —CH$_2$O—, —OCH$_2$—, —CH$_2$CH$_2$—, —CH=CH—, —C≡C—, —CHF—CHF—, —CF=CF—, —CF$_2$O—, —OCF$_2$—, —CF$_2$CF$_2$— or a single bond, and one or the Z[5] is alternatively —(CH$_2$)$_4$— or —CH=CH—CH$_2$CH$_2$—, and o is 1, 2 or 3 from 0 to 40% by wt. of at least one compound of formula V

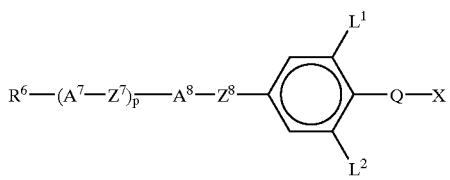

V in which

R[6] is H, an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may also each, independently of one another, be replaced by —O—, —S—,

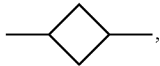

—CO—, —CO—O—, —O—CO— or —O—CO—O in such a way that O atoms are not linked directly to one another, A[7] and A[8] are each, independently of one another,
(a) a trans-1,4-cyclohexylene radical or 1,4-cyclohexenylene radical, in which, in addition, one or more non-adjacent CH$_2$ groups may be replaced by —O— and/or —S—,
(b) a 1,4-phenylene radical, in which, in addition, one or two CH groups may be replaced by N,
(c) a radical from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a), (b) and (c) may be substituted by one or two fluorine atoms, Z[7] and Z[8] are each, independently of one another, —CO—O—, —O—CO—, —CH$_2$O—OCH$_2$—, —CH$_2$CH$_2$—, —CH=CH—, —C≡C—, —CHF—CHF—, —CF=CF—, —CF$_2$O—, —OCF$_2$—, —CF$_2$CF$_2$— or a single bond, and one or the radicals Z[7] and Z[8] is alternatively —(CH$_2$)$_4$— or —CH=CH—CH$_2$CH$_2$—, L[1] and L[2] are each, independently of one another, H or F, Q is a polyfluoroalkylene radical of the formula —(O)$_q$—(CH$_2$)$_r$(CF$_2$)$_s$, —(O)$_q$—(CHF)$_r$(CF$_2$)$_s$ or —(O)$_q$—(CF$_2$)$_r$(CHF)$_s$—CF$_2$—, q is 0 or 1, r is 0, 1, 2, 3, 4, 5 or 6, s is 1, 2, 3, 4, 5 or 6, X is H, F or Cl, and p is 0, 1 or 2, and from 0 to 55% by wt. of at least one compound formula VI

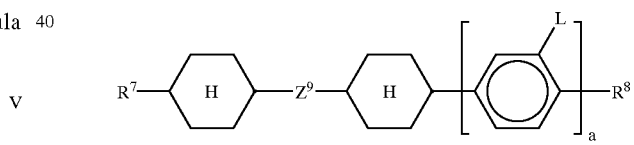

VI in which

R[7] is an alkenyl group having 2 to 7 carbon atoms,

Z[9] is —CH=CH—, —CH$_2$CH$_2$— or a single bond,

L is H or F, a is 0 or 1, and

R[8] is an alkyl, alkoxy or alkenyl group having up to 12 carbon atoms, in which, in addition, one or two non-adjacent CH$_2$ groups are each optionally replaced by —CO—, —OCO— or —COO—, or, if a is 1, R[8] may alternatively be F.

12. A display according to claim 1, wherein L is F.

13. A display according to claim 1, wherein R[1] is alkyl or alkenyl having up to 7 carbon atoms.

14. A display according to claim 1, wherein R[1] is ethyl, n-propyl, n-pentyl, vinyl, 1E-alkenyl or 3E-alkenyl.

15. A display according to claim 1, wherein said liquid-crystalline medium additionally comprises one or more compounds of formula III'

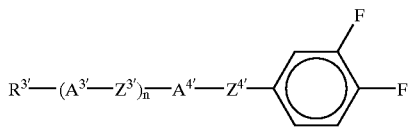

in which
R[3'] is H, an alkyl or alkenyl radical having up to 15 carbon atoms which is unsubstituted, monosubstituted by CN or CF$_3$ or at least monosubstituted by halogen and in which, in addition, one or more CH$_2$ groups in these radicals may also each, independently of one another, be replaced by —O—, —S—,

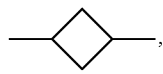

—CO—, —CO—O—, —O—CO— or —O—CO—O— in such a way that O atoms are not linked directly to one another, A[3'] and A[4'] are each, independently of one another,
(a) a trans-1,4-cyclohexylene radical or 1,4-cyclohexenylene radical, in which, in addition, one or more non-adjacent CH$_2$ groups may be replaced by —O— and/or —S—,
(b) a 1,4-phenylene radical, in which, in addition, one or two CH groups may be replaced by N,
(c) a radical from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl,
where the radicals (a), (b) and (c) may be substituted by one or two fluorine atoms, Z[3'] and Z[4'] are each, independently of one another, —CO—O—, —O—CO—, —CH$_2$O—, —OCH$_2$—, —CH$_2$CH$_2$—, —CH=CH—, —C≡C—, —CHF—CHF—, —CF=CF—, —CF$_2$O—, —OCF$_2$—, —CF$_2$CF$_2$— or a single bond, and one or the radicals Z[1] and Z[2] is alternatively —(CH$_2$)$_4$— or —CH=CH—CH$_2$CH$_2$—, and n' is 0, 1 or 2.

16. A display according to claim 2, wherein the compounds of formula II are selected from the following formulae:

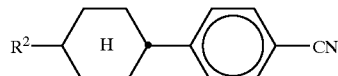

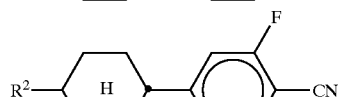

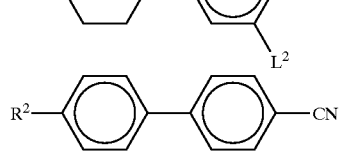

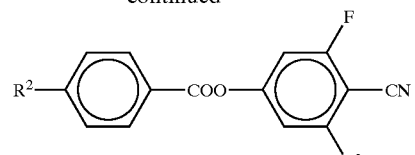

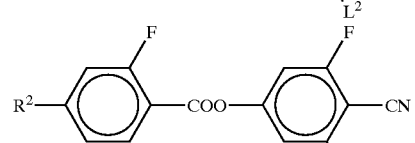

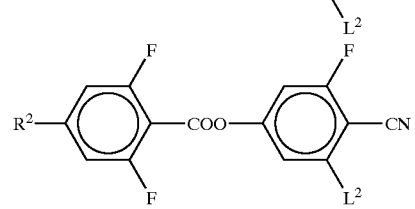

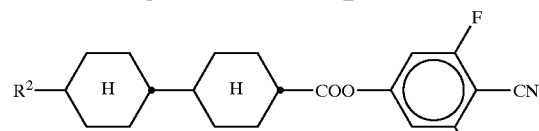

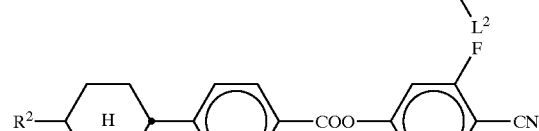

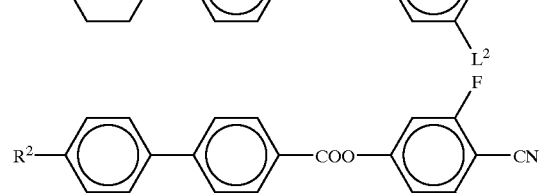

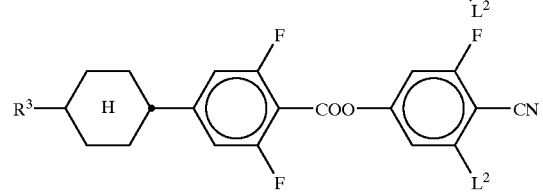

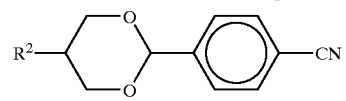

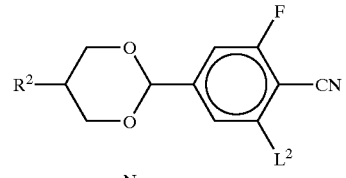

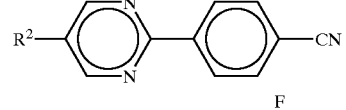

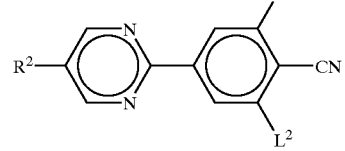

-continued

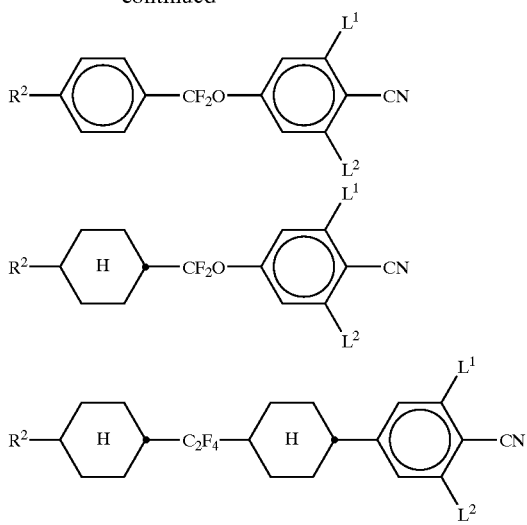

17. A display according to claim 1, wherein said medium additionally comprises one or more compounds selected from formulae VIIa to VIIc:

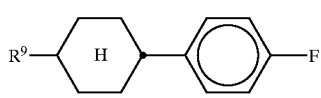

VIIa

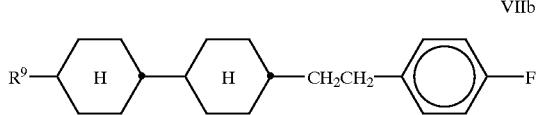

VIIb

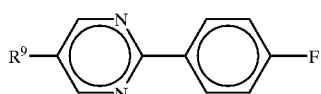

VIIc in which $R^9$ is H, an alkyl or alkenyl radical having up to 15 carbon atoms which is unsubstituted, monosubstituted by CN or $CF_3$ or at least monosubstituted by halogen and in which, in addition, one or more $CH_2$ groups in these radicals may also each, independently of one another, be replaced by —O—, —S—,

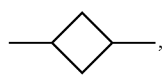

—CO—, —CO—O—, —O—CO— or —O—CO—O— in such a way that O atoms are not linked directly to one another.

18. A display according to claim 1, wherein said medium additionally comprises one or more compounds of formula VIII

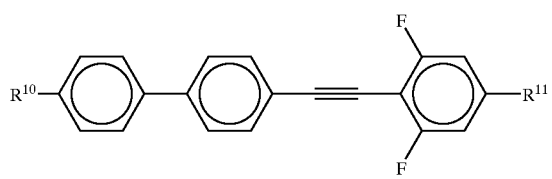

VIII in which $R^{10}$ and $R^{11}$ are each, independently of one another, straight-chain alkyl or alkoxy.

19. A display according to claim 1, wherein said medium additionally comprises one or more compounds of formula IX

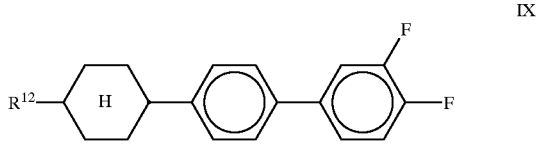

IX in which
$R^2$ is H, an alkyl or alkenyl radical having up to 15 carbon atoms which is unsubstituted, monosubstituted by CN or $CF_3$ or at least monosubstituted by halogen and in which, in addition, one or more $CH_2$ groups in these radicals may also each, independently of one another, be replaced by —O—, —S—,

—CO—, —CO—O—, —O—CO— or —O—CO—O— in such a way that O atoms are not linked directly to one another.

20. A display according to claim 1, wherein said medium additionally comprises one or more compounds of negative dielectric anisotropy selected from formulae X, XI and XII:

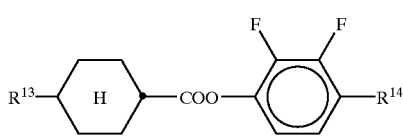

X

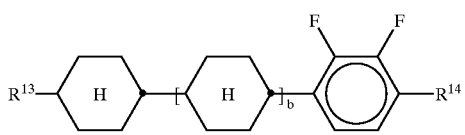

XI

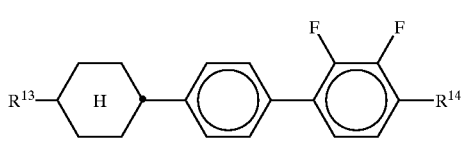

XII in which
$R^{13}$ and $R^{14}$ each, independently of one another, are H, an alkyl or alkenyl radical having up to 15 carbon atoms which is unsubstituted, monosubstituted by CN or $CF_3$ or at least mono-substituted by halogen and in which, in addition, one or more $CH_2$ groups in these radicals may also each, independently of one another, be replaced by —O—, —S—

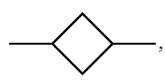

—CO—, —CO—O—, —O—CO— or —O—CO—O—, in such a way that O atoms are not linked directly to one another.

21. A display according to claim 1, wherein said medium additionally comprises one or more difluorostilbenes of formula XIII,

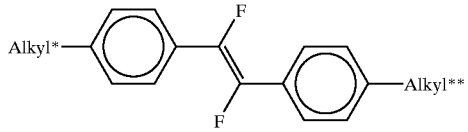

XIII in which Alkyl* and Alkyl** are each independently a straight-chain alkyl radical having 1 to 6 carbon atoms.

22. A display according to claim 1, wherein said medium additionally comprises one or more compounds of the formula XIV

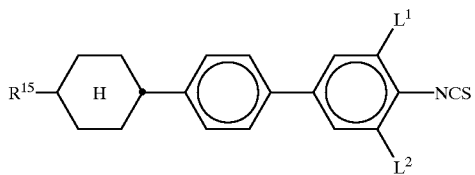

XIV in which $R^{15}$ has one of the meaning defined for $R^1$, and $L^1$ and $L^2$ are each, independently of one another, H or F.

23. A display according to claim 1, wherein said medium additionally comprises one or more compounds of the formula XV

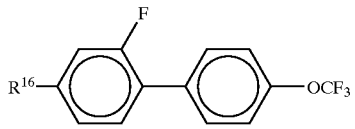

XV in which $R^{16}$ has one of the meanings defined for $R^1$.

24. A display according to claim 1, wherein said medium contains from 2 to 40% by weight of at least one compound of formula I.

25. A display according to claim 7, wherein said medium contains from 15 to 85% by weight of at least one compound selected from the compounds of formulae II and III.

26. A display according to claim 4, wherein said medium contains up to 60% by weight of at least one compound of the formula IV.

27. A display according to claim 5, wherein said medium contains up to 40% by weight of at least one compound of the formula V.

28. A display according to claim 6, wherein said medium contains up to 55% by weight of at least one compound of the formula VI.

29. A display according to claim 1, wherein said medium has a birefringence (Δn) of <0.14.

30. A display according to claim 1, wherein said medium has a bireflingence in the range from 0.06 to 0.13.

31. A display according to claim 1, wherein said medium has a flow viscosity $v_{20}$ (at 20° C.) of less than 30 $mm^2 \cdot s^{-1}$.

32. A display according to claim 1, wherein said medium has a flow viscosity $v_{20}$ (at 20° C.) of between 15 and 25 $mm^2 \cdot s^{-1}$.

33. A display according to claim 1, wherein said medium has a specific resistance at 20° C. of from $5 \times 10^{10}$ to $5 \times 10^{14} \Omega \cdot cm$.

34. A display according to claim 1, wherein said medium has a rotational viscosity $\gamma_1$ at 20° C. of less than 80 mPa·s.

* * * * *

UNITED STATES PATENT AND TRADEMARK OFFICE
CERTIFICATE OF CORRECTION

PATENT NO. : 6,815,017 B2
DATED : November 9, 2004
INVENTOR(S) : Michael Heckmeier It is certified that error appears in the above-identified patent and that said Letters Patent is hereby corrected as shown below:

Column 40,
Line 58, reads "$R^3$-$(A^3$-$Z^3)_m$-$A^4$-$Z^4$", should read -- $R^3$-$(A^3$-$Z^3)_n$-$A^4$-$Z^4$ --

Column 41,
Line 27, reads "–CHF=CHF-, –CF-CF-", should read -- –CHF-CHF-, —CF = CF- --
Line 29, reads "–$(CH_3)_4$-", should read -- –$(CH_2)_4$- --

Column 45,
Line 2, reads "$R^1$", should read -- $R^5$ --

Signed and Sealed this

Thirty-first Day of May, 2005

JON W. DUDAS
*Director of the United States Patent and Trademark Office*